(12) United States Patent
Koide et al.

(10) Patent No.: US 7,516,987 B2
(45) Date of Patent: Apr. 14, 2009

(54) BUCKLE PRETENSIONER SYSTEM

(75) Inventors: Teruhiko Koide, Aichi-ken (JP); Koji Muto, Aichi-ken (JP); Masayoshi Nojiri, Aichi-ken (JP); Toshihito Miyagawa, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 519 days.

(21) Appl. No.: 11/145,993

(22) Filed: Jun. 7, 2005

(65) Prior Publication Data

US 2005/0269148 A1 Dec. 8, 2005

(30) Foreign Application Priority Data

Jun. 8, 2004 (JP) .............................. 2004-169656

(51) Int. Cl.
*B60R 22/28* (2006.01)
*B60R 22/195* (2006.01)

(52) U.S. Cl. ................. 280/806; 280/801.1; 280/801.2; 280/805; 297/473; 297/474; 297/480

(58) Field of Classification Search ............. 280/801.2, 280/805, 806, 801.1; 297/473, 474, 480; *B60R 22/195, B60R 22/28*
See application file for complete search history.

(56) References Cited

U.S. PATENT DOCUMENTS

| | | | | | |
|---|---|---|---|---|---|
| 4,763,924 | A | * | 8/1988 | Karlin et al. ................. | 280/806 |
| 4,913,497 | A | * | 4/1990 | Knabel et al. ................. | 297/480 |
| 4,923,214 | A | * | 5/1990 | Siegrist et al. ............... | 280/806 |
| 5,064,220 | A | * | 11/1991 | Ogawa ..................... | 280/801.1 |
| 5,127,671 | A | * | 7/1992 | Yano et al. ................... | 280/806 |
| 5,288,105 | A | * | 2/1994 | Ikegaya et al. .............. | 280/806 |
| 5,313,690 | A | * | 5/1994 | Hiramatsu et al. ............ | 24/641 |
| 5,374,110 | A | * | 12/1994 | Hiramatsu ................... | 297/480 |
| 5,496,068 | A | * | 3/1996 | Ball et al. .................... | 280/806 |
| 5,634,690 | A | * | 6/1997 | Watanabe et al. ............ | 297/480 |
| 5,651,564 | A | * | 7/1997 | Isaji et al. ................... | 280/806 |
| 5,676,397 | A | * | 10/1997 | Bauer .......................... | 280/806 |
| 5,782,492 | A | * | 7/1998 | Ojima et al. ................. | 280/806 |

(Continued)

FOREIGN PATENT DOCUMENTS

JP 05-254395 10/1993

(Continued)

*Primary Examiner*—Ruth Ilan
*Assistant Examiner*—Barry Gooden, Jr.
(74) *Attorney, Agent, or Firm*—Roberts Mlotkowski Safran & Cole, P.C.; Thomas W. Cole

(57) ABSTRACT

A buckle pretensioner system includes a substantially L-shaped rail for guiding a buckle body of a buckle from a position where the buckle body engages with a tongue plate to a position corresponding to a lumbar region of a vehicle occupant. When a vehicle disposed with the buckle pretensioner system undergoes a sudden deceleration, a piston inside a cylinder is moved in a frontward direction of the vehicle by gas generated by the actuation of a gas generator, a buckle stay is pulled by a wire coupled to the piston, and the buckle stay is moved along the shape of the rail. As a result, the buckle body supported by the buckle stay pivots from the position where the buckle body engages with the tongue plate to a vehicle occupant restraining position of a webbing belt, and then is pulled to the lumbar region-corresponding position.

2 Claims, 18 Drawing Sheets

U.S. PATENT DOCUMENTS

| | | | |
|---|---|---|---|
| 5,984,357 A * | 11/1999 | Yasuda et al. | 280/806 |
| 6,164,700 A * | 12/2000 | Masuda et al. | 280/806 |
| 6,213,513 B1 * | 4/2001 | Grabowski et al. | 280/806 |
| 6,276,721 B1 * | 8/2001 | Romeo | 280/808 |
| 6,419,272 B1 * | 7/2002 | Yamaguchi et al. | 280/806 |
| 6,497,456 B1 * | 12/2002 | Masuda et al. | 297/480 |
| 6,513,880 B2 * | 2/2003 | Yamaguchi et al. | 297/468 |
| 6,851,715 B2 * | 2/2005 | Devereaux et al. | 280/806 |
| 6,902,195 B2 * | 6/2005 | Ball et al. | 280/806 |
| 2003/0030264 A1 * | 2/2003 | Motozawa | 280/806 |
| 2003/0047931 A1 * | 3/2003 | Rees et al. | 280/806 |
| 2003/0184076 A1 * | 10/2003 | Devereaux et al. | 280/806 |
| 2004/0000783 A1 * | 1/2004 | Biller et al. | 280/806 |
| 2004/0046382 A1 * | 3/2004 | Ball et al. | 280/806 |
| 2004/0256850 A1 * | 12/2004 | Yamaguchi | 280/806 |

FOREIGN PATENT DOCUMENTS

JP          08-040205          2/1996

* cited by examiner

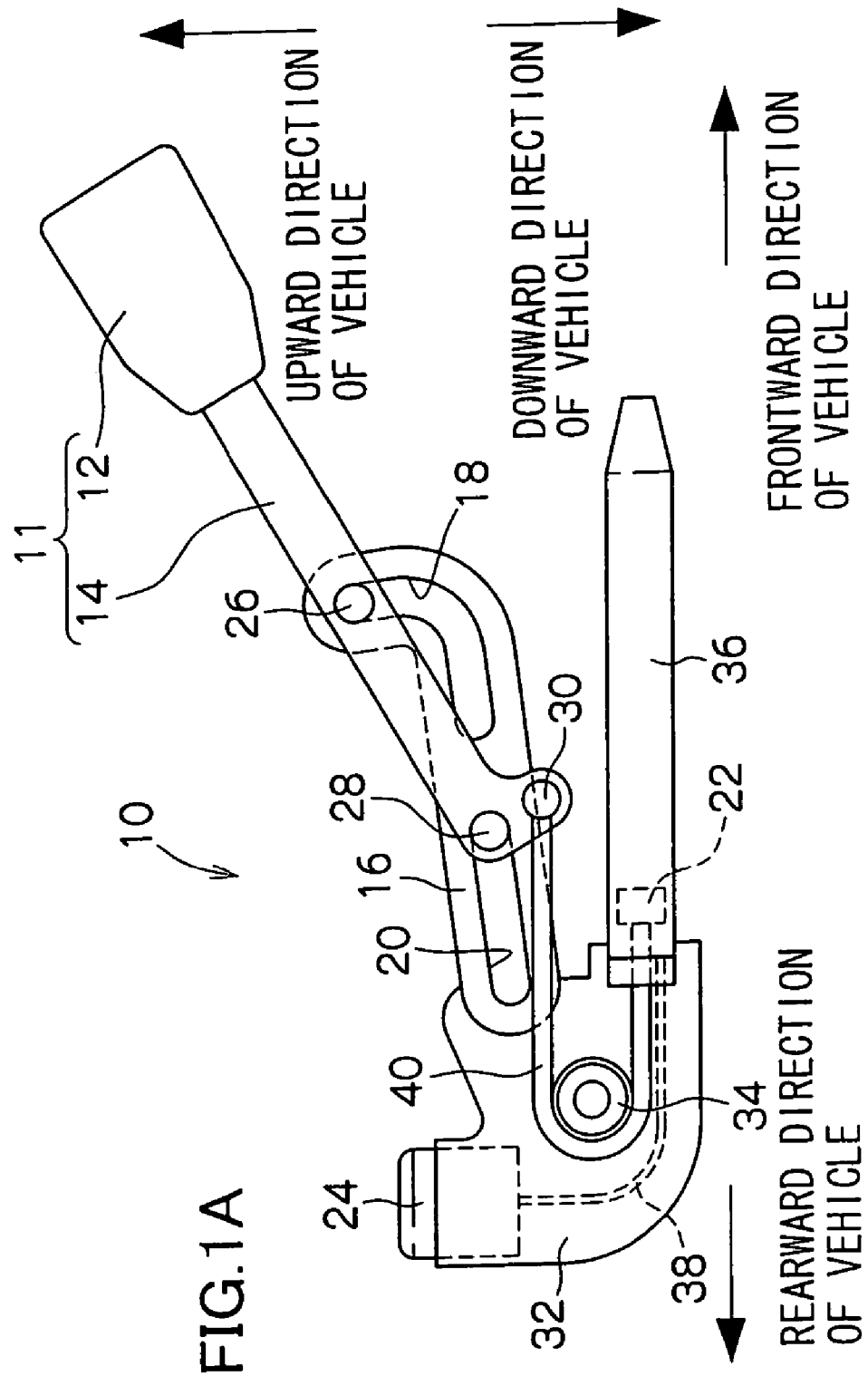

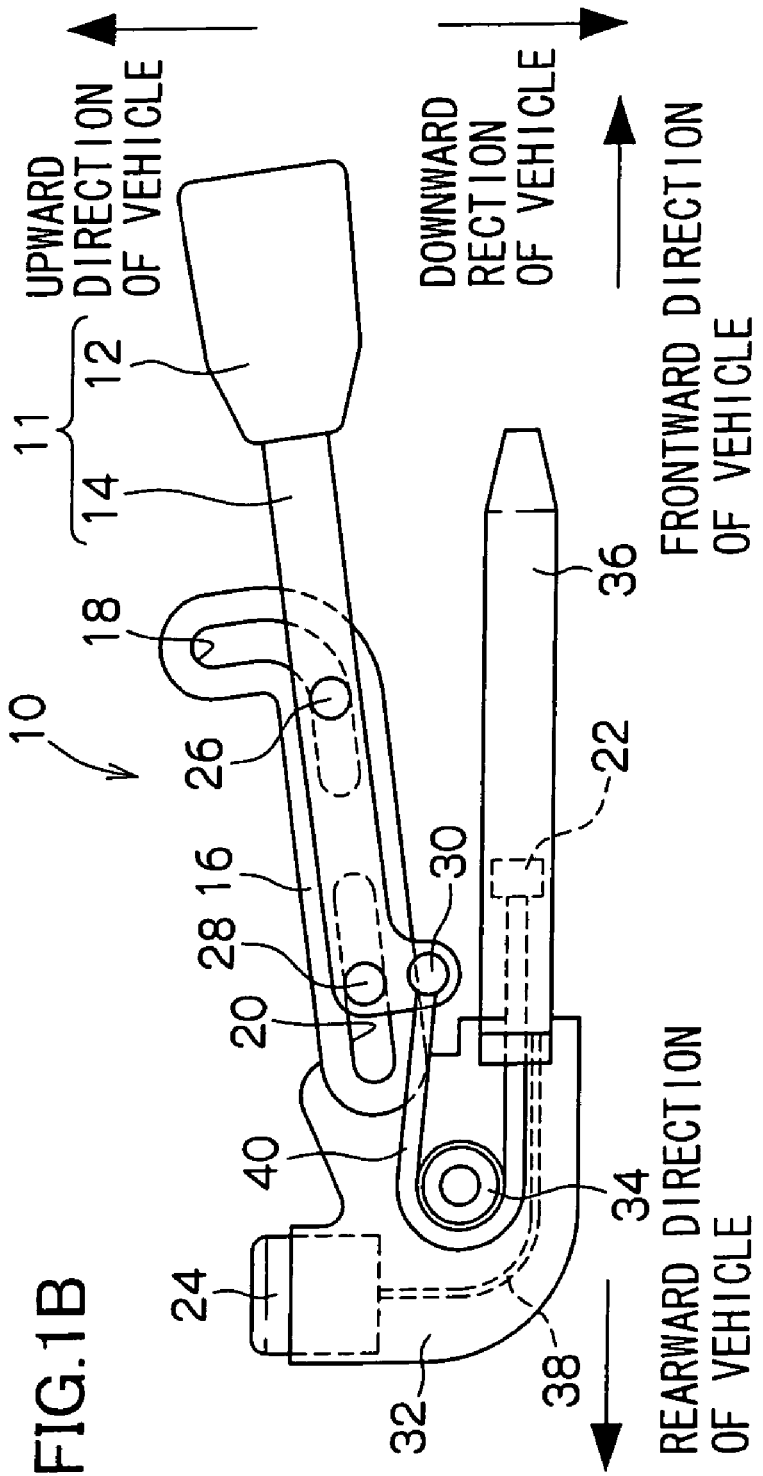

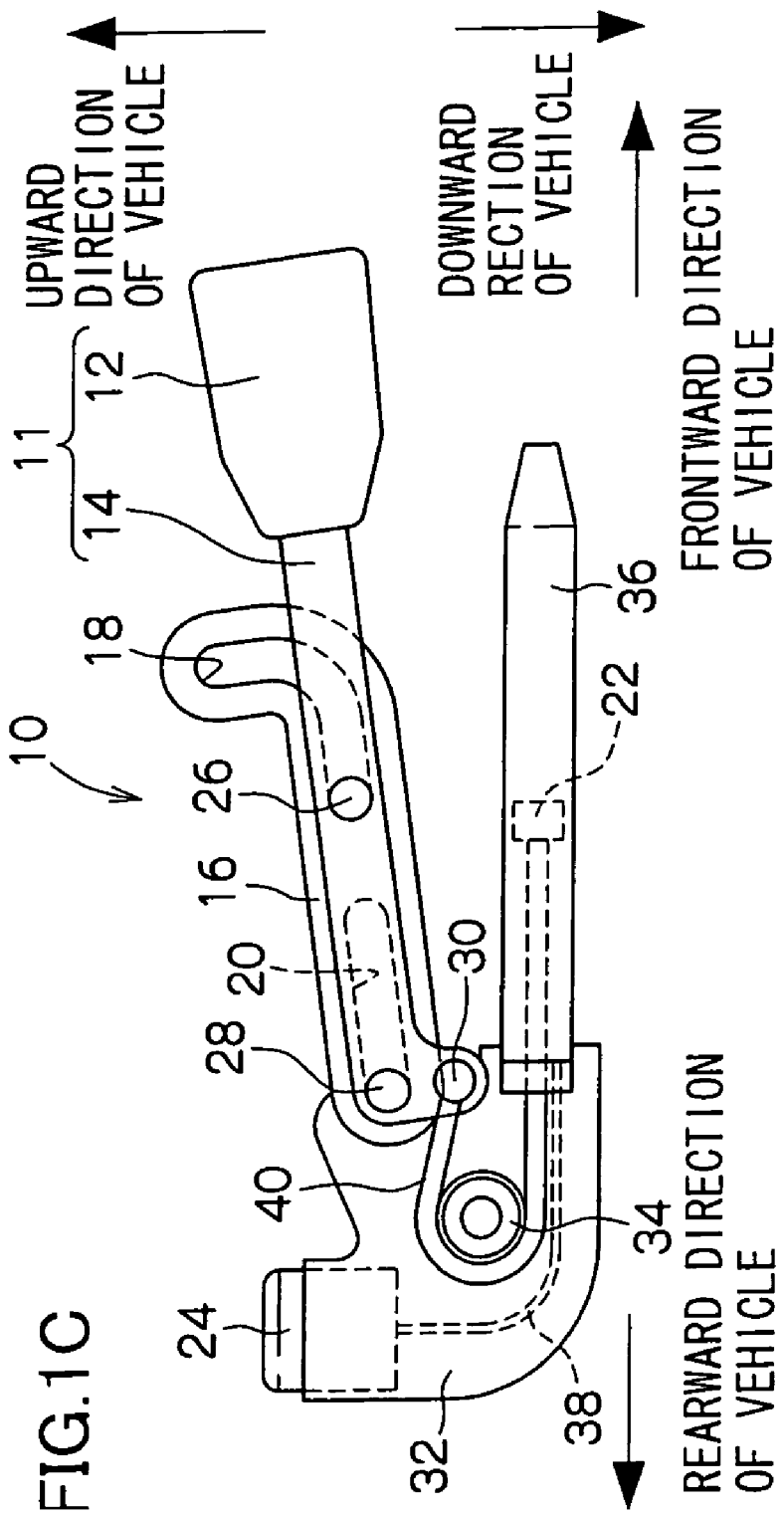

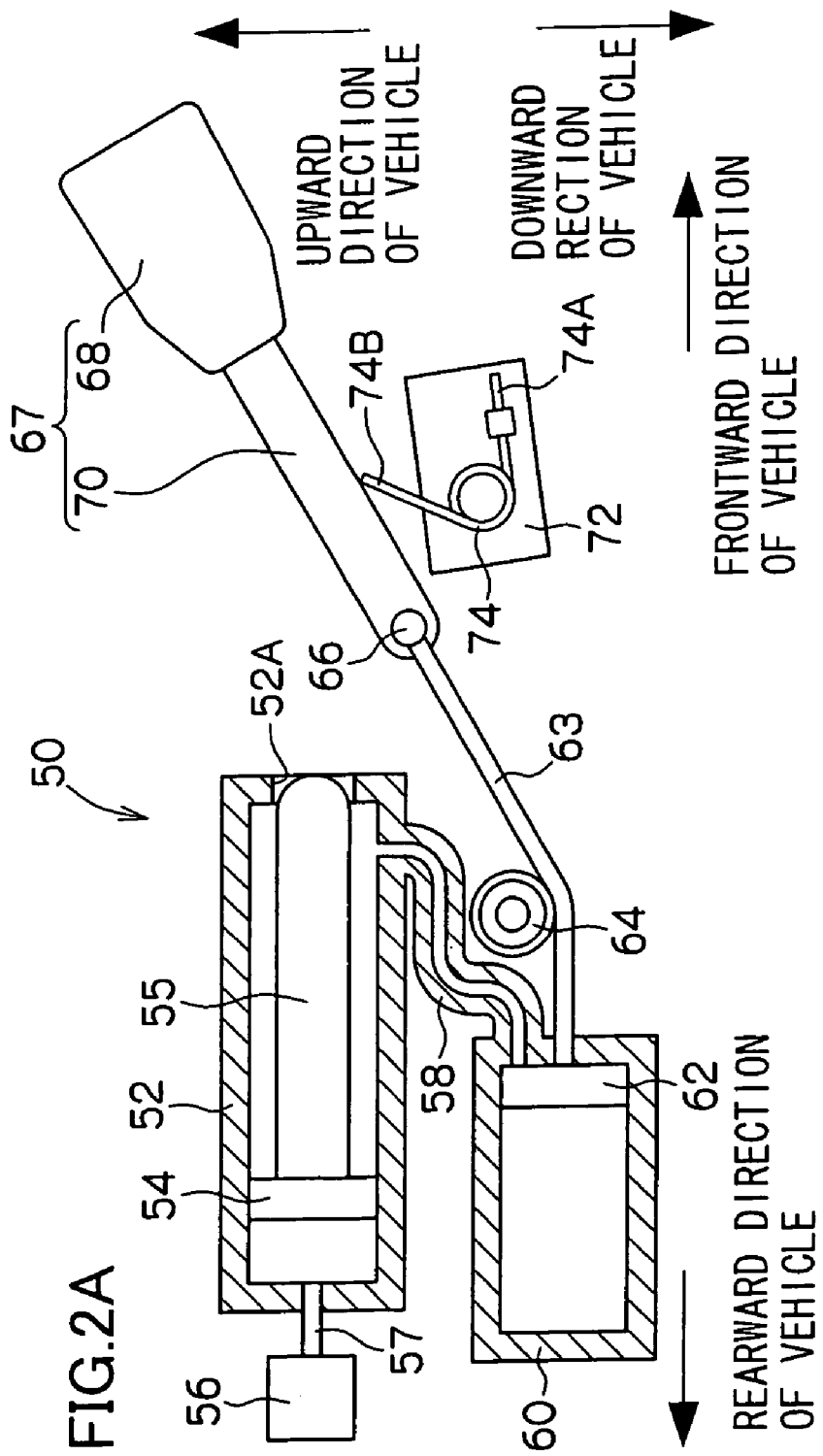

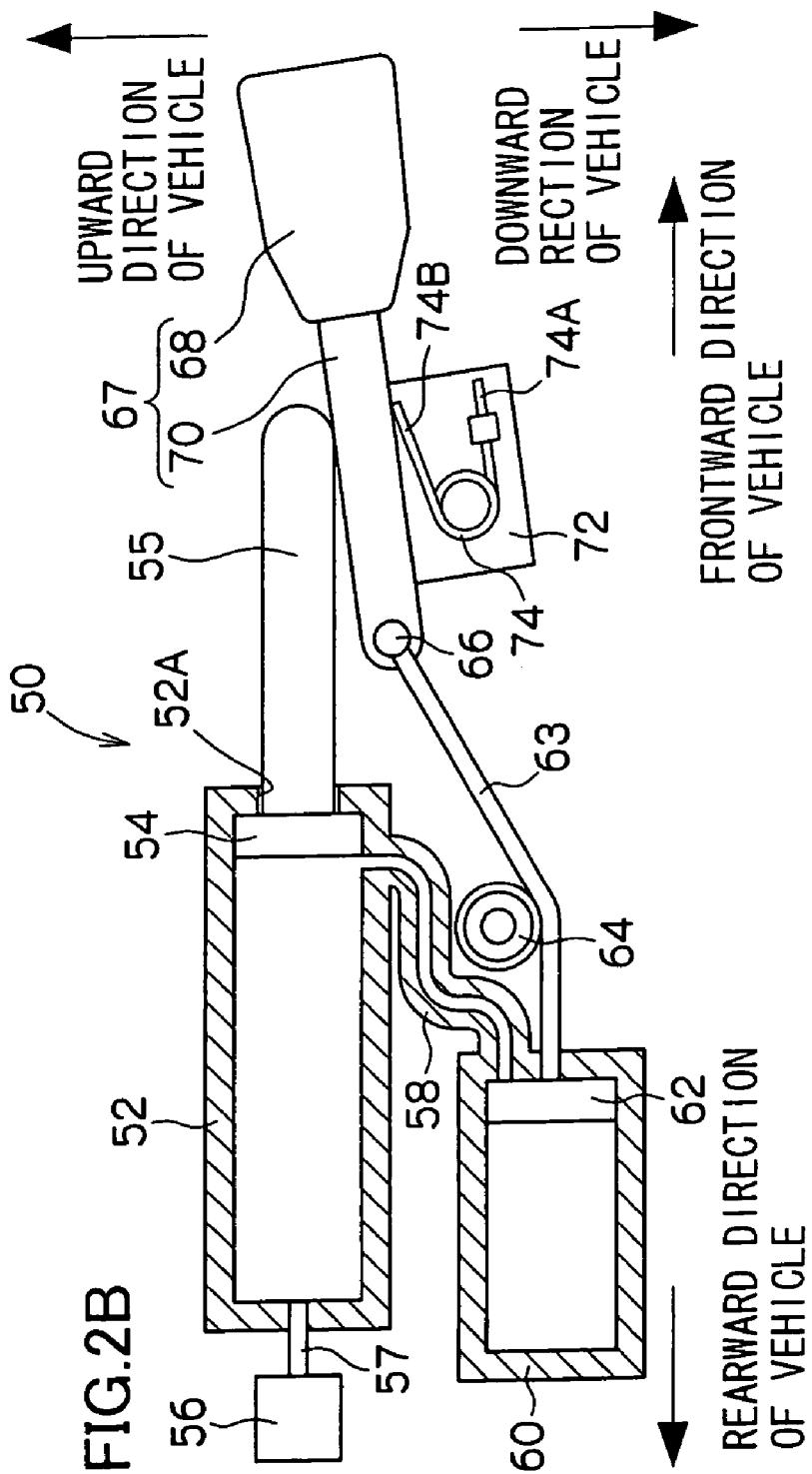

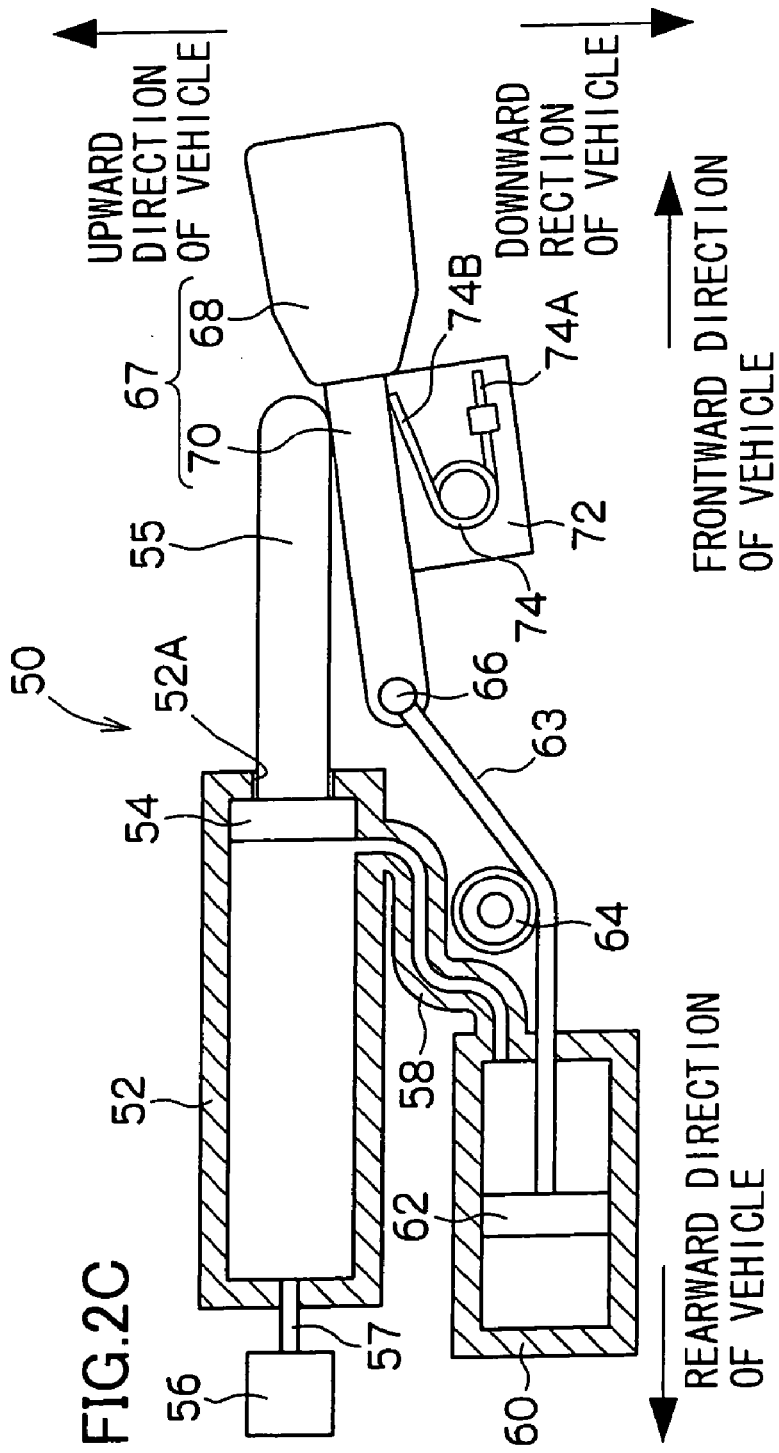

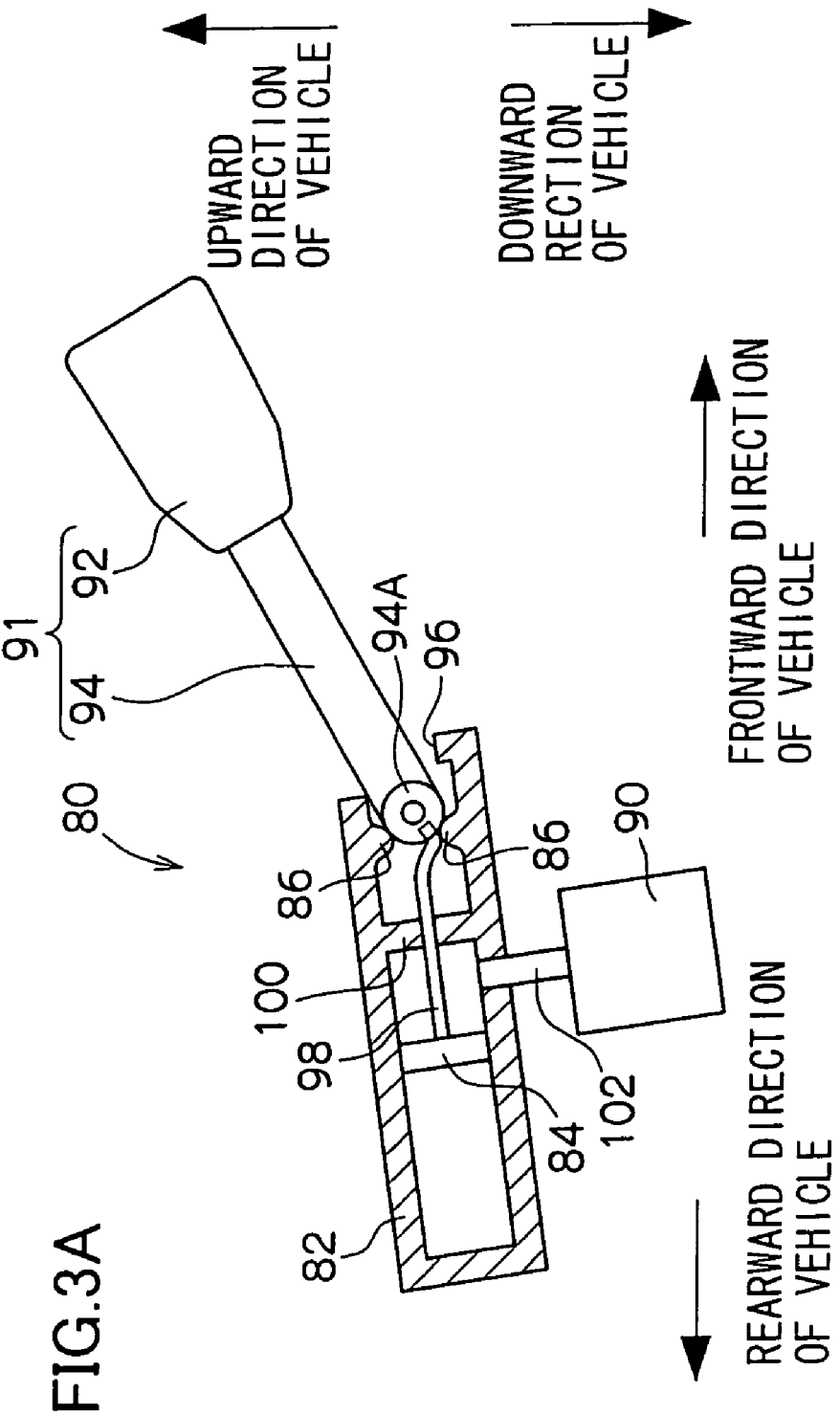

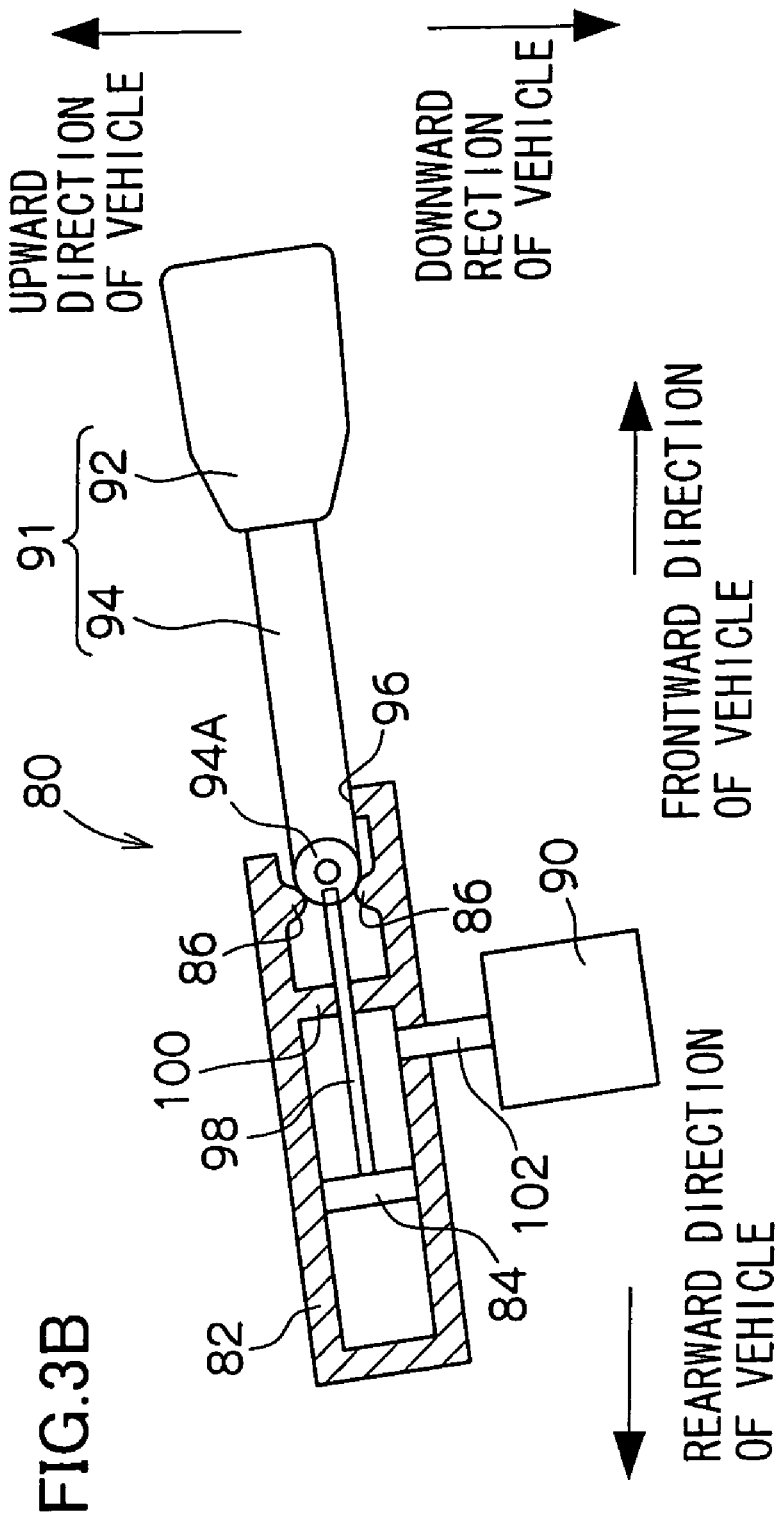

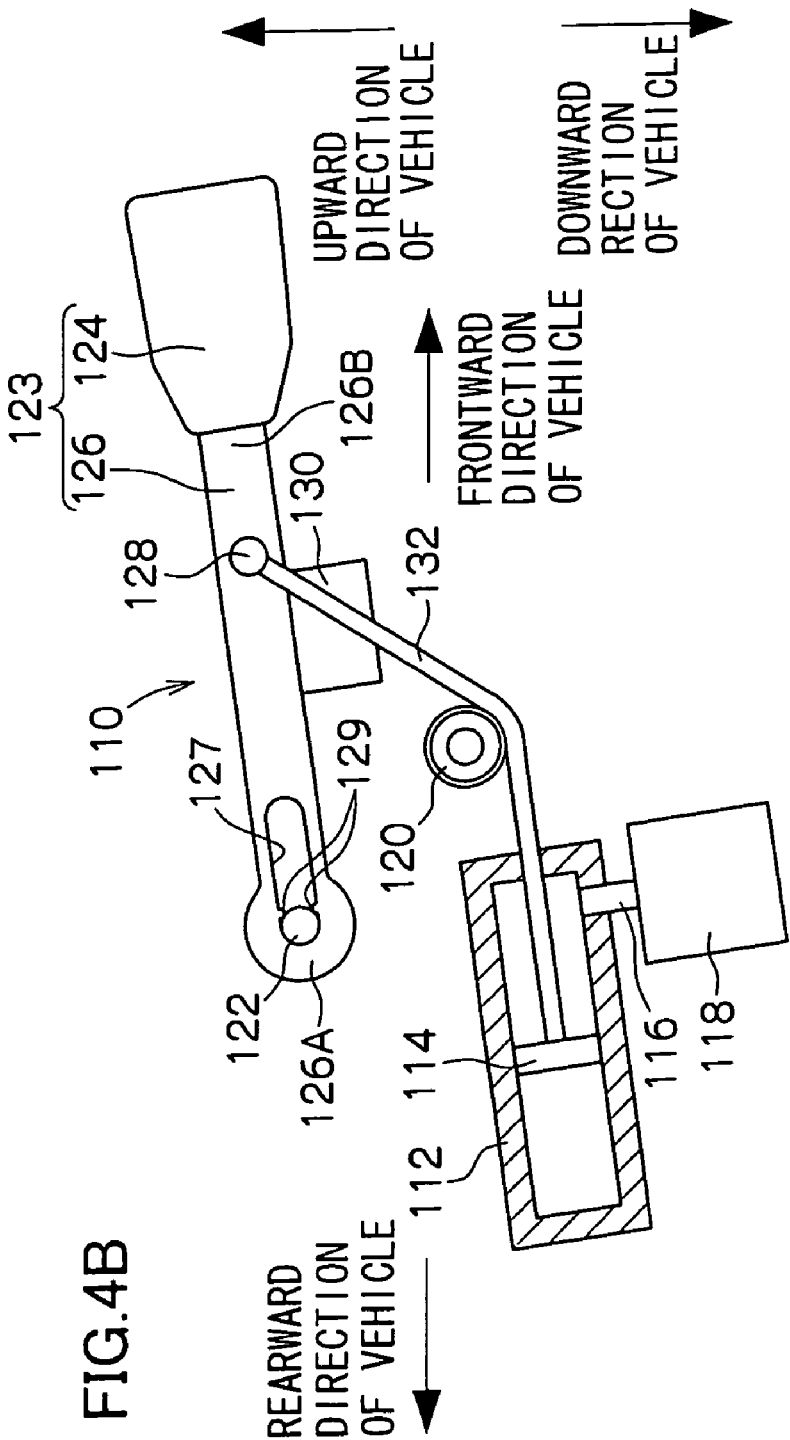

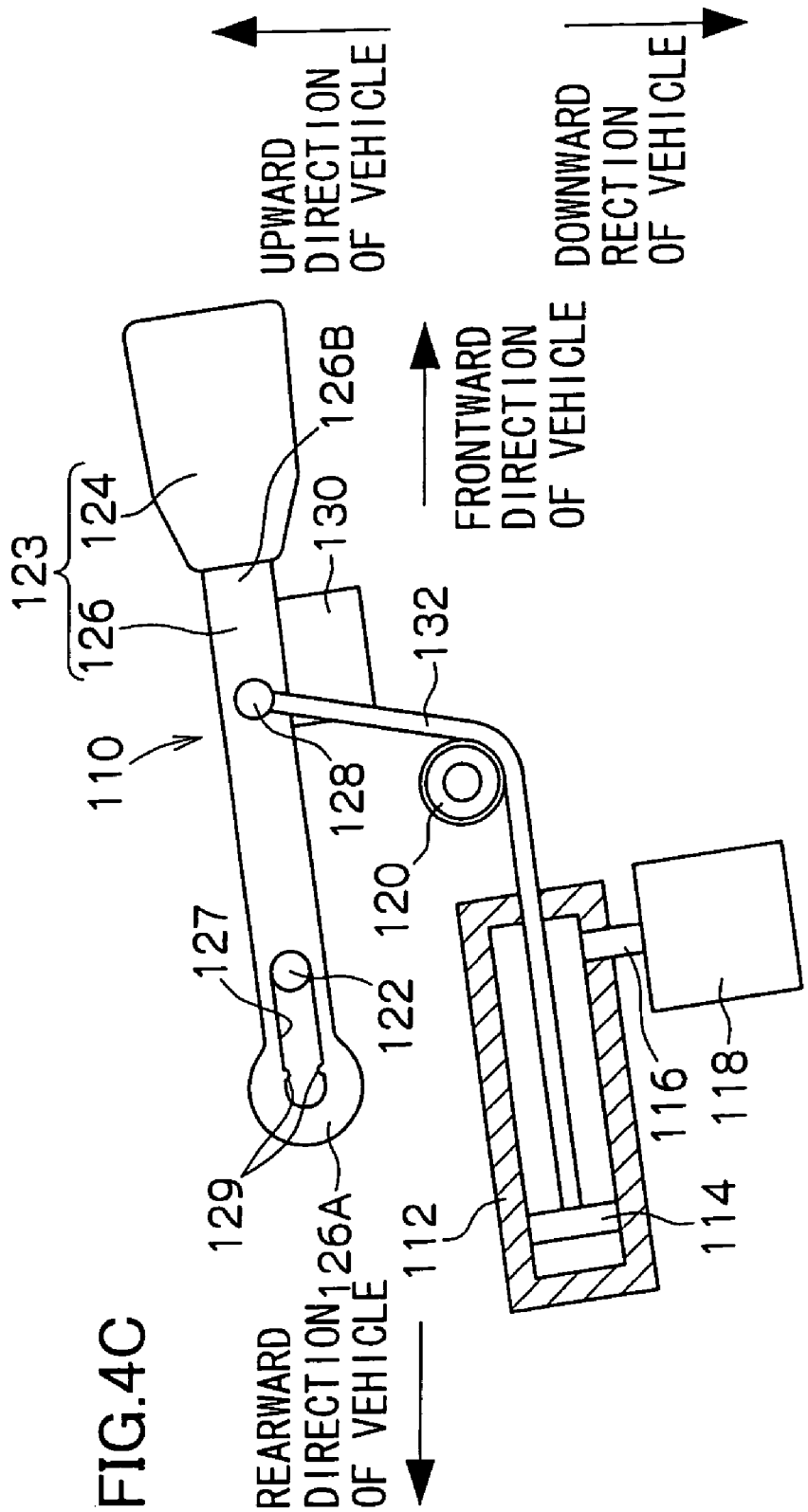

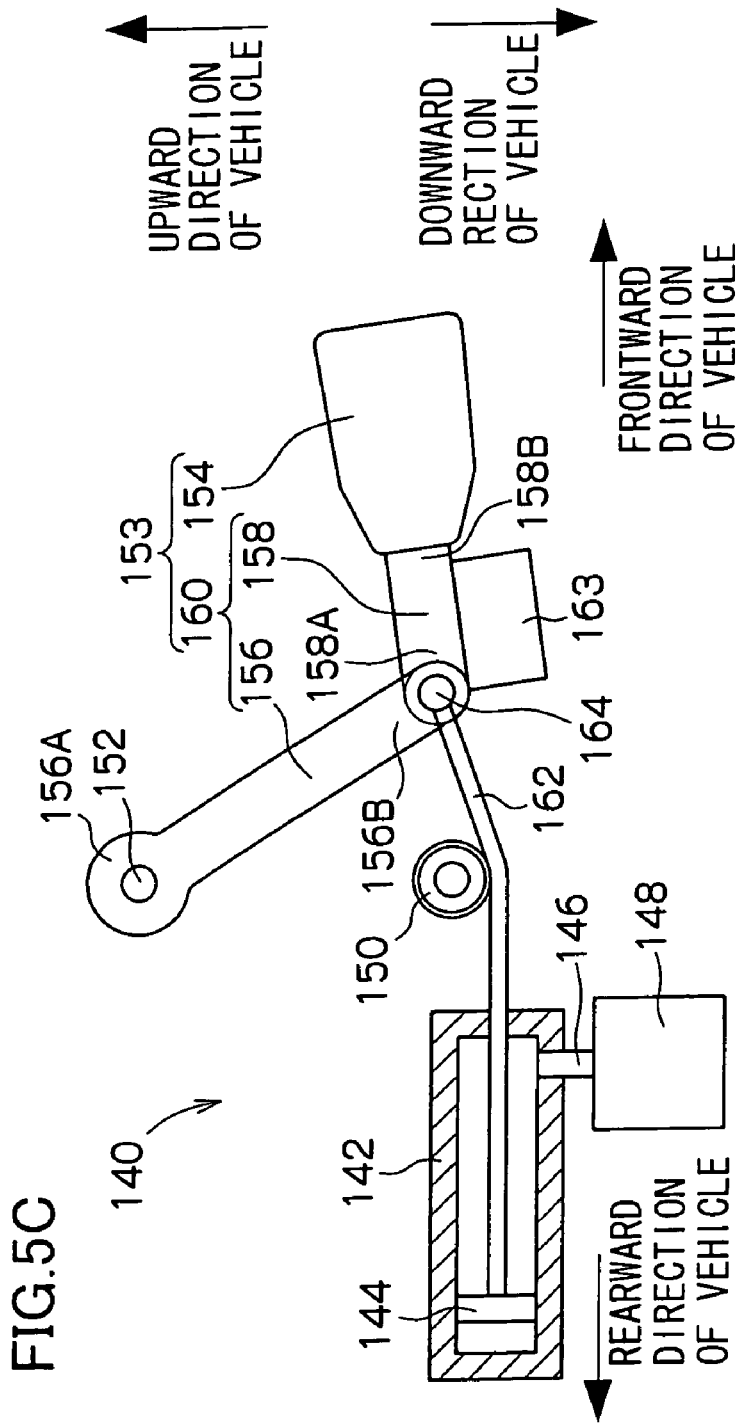

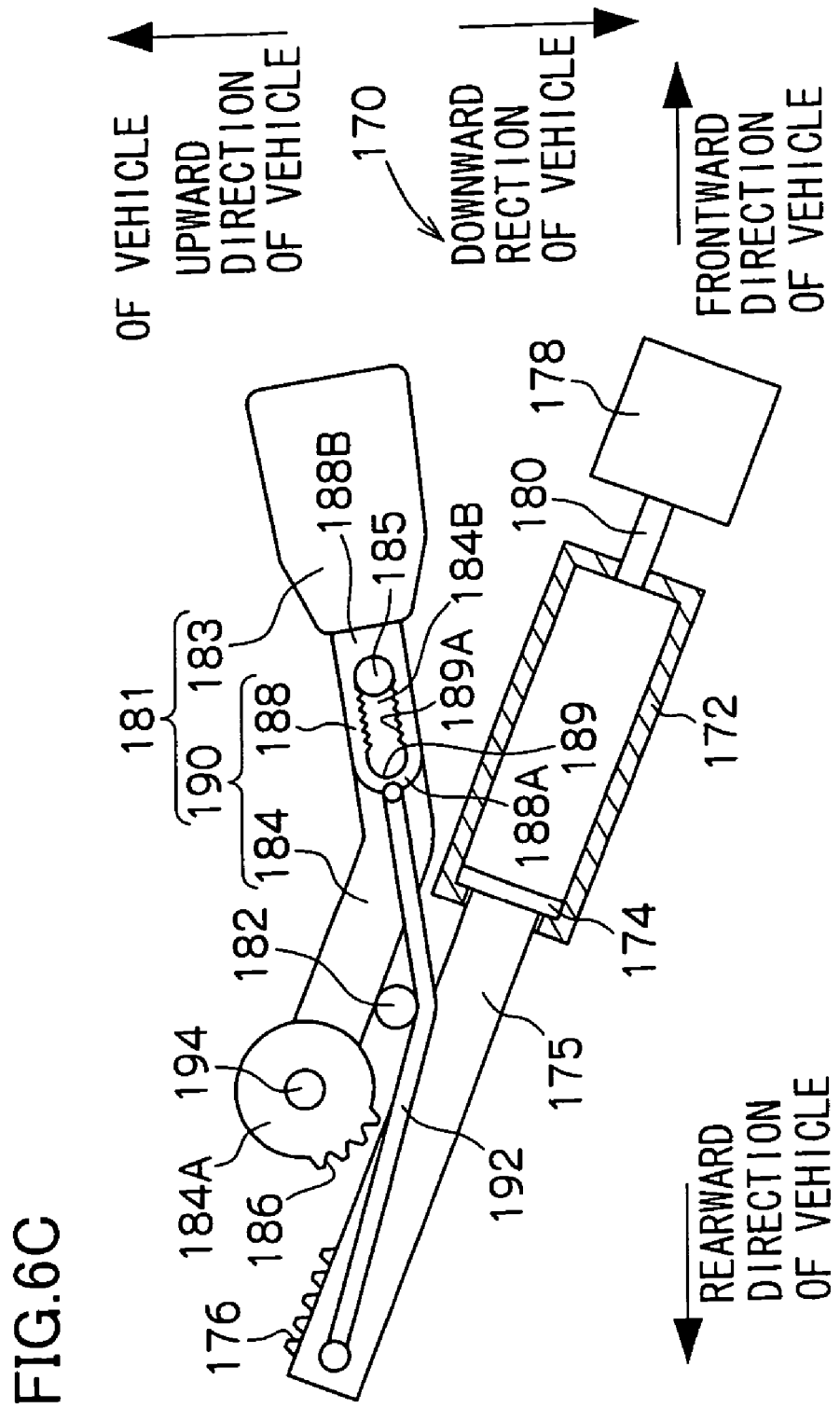

BUCKLE PRETENSIONER SYSTEM

CROSS-REFERENCE TO RELATED APPLICATION

This application claims priority under 35 USC 119 from Japanese Patent Application No. 2004-169656, the disclosure of which is incorporated by reference herein.

BACKGROUND OF THE INVENTION

1. Field of the Invention

The present invention relates to a buckle pretensioner system which, when a vehicle disposed with the buckle pretensioner system undergoes a sudden deceleration, pulls, in a vehicle occupant restraining direction of a webbing belt for restraining a vehicle occupant, a buckle that engages with a tongue plate inserted through an intermediate portion of the webbing belt.

2. Description of the Related Art

In a seat belt device, a tongue plate inserted through an intermediate portion of a webbing belt is inserted into and engages with a buckle, whereby the body of a seated vehicle occupant is restrained by the webbing belt.

There are also seat belt devices disposed with a pretensioner system that improves the restraint of the vehicle occupant by pulling back, by a predetermined amount per buckle, the webbing belt worn by the vehicle occupant when the vehicle undergoes a sudden deceleration. Examples thereof are disclosed in Japanese Patent Application Laid-Open Publication (JP-A) Nos. 5-254395 and 8-40205.

In a vehicle disposed with a back seat, there are many instances where the vehicle occupant is seated in various postures. For this reason, even if the vehicle occupant is wearing the webbing belt, sometimes the webbing belt does not catch on the proper position of the vehicle occupant, such as the lumbar region. If the vehicle suddenly decelerates and the pretensioner system is actuated in this state, a large load ends up being applied to the vehicle occupant from the webbing belt.

Various countermeasures have been devised to address this problem, such as reducing the reclinable angle of the seat so that an excessive reclining angle cannot be set, and increasing the hardness of the front part of the seat cushion to make it difficult for the lumbar region of the vehicle occupant to slide forward from the proper position in the seat.

However, in systems where such countermeasures have been administered, there has been the drawback that the comfort is reduced when the vehicle occupant is seated in the seat.

SUMMARY OF THE INVENTION

In view of this problem, there is needed a buckle pretensioner system that can preserve comfort when a vehicle occupant is seated and can suppress the occurrence of the "submarine phenomenon" when the vehicle experiences a sudden deceleration (i.e., when, in the event of a collision, the body of a vehicle occupant catches on the seat belt and slides underneath even though the seat belt is being worn by the vehicle occupant).

A first aspect of the invention provides a buckle pretensioner system disposed in a vehicle, the buckle pretensioner system comprising: a buckle that engages with a tongue plate inserted through an intermediate portion of a webbing belt for restraining a vehicle occupant; a pulling device that is coupled to the buckle and actuated when the vehicle undergoes a sudden deceleration, with the pulling device pulling the buckle in a vehicle occupant restraining direction of the webbing belt; and a guide device which, due to the actuation of the pulling device, guides the buckle from a position where the buckle engages with the tongue plate at an ordinary time, through a position further in a downward direction of the vehicle than the engagement position, to a lumbar region-corresponding position that is positioned further in a rearward direction of the vehicle than the position in the downward direction of the vehicle and corresponds to a lumbar region of a seated vehicle occupant.

In this buckle pretensioner system, when the tongue plate inserted through the intermediate portion of the webbing belt for restraining a vehicle occupant engages with the buckle, the body of the vehicle occupant is restrained by the webbing belt.

When the vehicle undergoes a sudden deceleration in a state where the vehicle occupant is wearing the webbing belt in this manner, the pulling device coupled to the buckle is actuated. When the pulling device is actuated, the buckle is pulled in the vehicle occupant restraining direction of the webbing belt. As a result, the buckle is pulled in the vehicle occupant restraining direction of the webbing belt, and the body of the vehicle occupant is more tightly restrained by the webbing belt.

In this case, the buckle pulled by the actuation of the pulling device is guided by the guide device from the position where the buckle engages with the tongue plate at the ordinary time to the position further in the downward direction of the vehicle than the engagement position, and then is guided to the lumbar region-corresponding position that is positioned further in the rearward direction of the vehicle than the position in the downward direction of the vehicle and corresponds to the lumbar region of a seated vehicle occupant. For this reason, the tongue plate engaged with the buckle also moves in the downward direction of the vehicle and is guided to the lumbar region-corresponding position in the rearward direction of the vehicle, and the webbing belt reliably restrains the lumbar region of the vehicle occupant. Thus, the buckle pretensioner system can suppress the occurrence of the "submarine phenomenon."

Also, because the buckle pretensioner system is configured so that the buckle is guided to the lumbar region-corresponding position when the vehicle undergoes a sudden deceleration, the buckle pretensioner system can be applied to a common seat without having to implement countermeasures such as reducing the range of the reclinable angle of the seat or increasing the hardness of the front part of the seat cushion. Thus, the buckle pretensioner system can preserve comfort when the vehicle occupant is seated in the seat.

A second aspect of the invention provides a buckle pretensioner system disposed in a vehicle, the buckle pretensioner system comprising: a buckle that engages with a tongue plate inserted through an intermediate portion of a webbing belt for restraining a vehicle occupant; a pulling device that is coupled to the buckle and actuated when the vehicle undergoes a sudden deceleration, with the pulling device pulling the buckle in a vehicle occupant restraining direction of the webbing belt; and a guide device which, due to the actuation of the pulling device, guides the buckle by causing the buckle to rotate from a position where the buckle engages with the tongue plate at an ordinary time to a position further in a downward direction of the vehicle than the engagement position, and which guides the buckle by causing the buckle to linearly move from the position in the downward direction of the vehicle to a lumbar region-corresponding position that is positioned further in a rearward direction of the vehicle than the position in the downward direction of the vehicle and corresponds to a lumbar region of a seated vehicle occupant.

In this buckle pretensioner system, when the tongue plate inserted through the intermediate portion of the webbing belt for restraining a vehicle occupant engages with the buckle, the body of the vehicle occupant is restrained by the webbing belt.

When the vehicle undergoes a sudden deceleration in a state where the vehicle occupant is wearing the webbing belt in this manner, the pulling device coupled to the buckle is actuated. When the pulling device is actuated, the buckle is pulled in the vehicle occupant restraining direction of the webbing belt. As a result, the buckle is pulled in the vehicle occupant restraining direction of the webbing belt, and the body of the vehicle occupant is more tightly restrained by the webbing belt.

In this case, the buckle pulled by the actuation of the pulling device is rotated ("rotation" here refers to movement on a curve having a predetermined radius of curvature, with the center of rotation not invariably being limited to one point, and includes curvilinear motion moving on the perimeter of an ellipse, for example) and guided by the guide device from the position where the buckle engages with the tongue plate at the ordinary time to the position further in the downward direction of the vehicle than the engagement position. Next, the buckle is linearly moved and guided to the lumbar region-corresponding position that is positioned further in the rearward direction of the vehicle than the position in the downward direction of the vehicle and corresponds to the lumbar region of a seated vehicle occupant. For this reason, the tongue plate engaged with the buckle also moves in the downward direction of the vehicle and is guided to the lumbar region-corresponding position in the rearward direction of the vehicle, and the webbing belt reliably restrains the lumbar region of the vehicle occupant. Thus, the buckle pretensioner system can suppress the occurrence of the "submarine phenomenon."

Also, because the buckle pretensioner system is configured so that the buckle is guided to the lumbar region-corresponding position when the vehicle undergoes a sudden deceleration, the buckle pretensioner system can be applied to a common seat without having to implement countermeasures such as reducing the range of the reclinable angle of the seat or increasing the hardness of the front part of the seat cushion. Thus, the buckle pretensioner system can preserve comfort when the vehicle occupant is seated in the seat.

In the buckle pretensioner system of either aspect of the invention, the buckle may include: a buckle body that engages with the tongue plate; and a buckle stay that supports the buckle body. Also, the guide device may include: a rail that corresponds to a moving path of the buckle body from the engagement position to the lumbar region-corresponding position and is curved and formed in a substantial "L" shape, with the curved portion corresponding to the vehicle occupant restraining position of the webbing belt and being disposed further in the downward direction of the vehicle than the engagement position; and a retaining member that retains the buckle stay in the rail so that the buckle stay is movable along the rail.

In the buckle pretensioner system of either aspect of the invention, the buckle stay may be retained in the rail by the retaining member so that the buckle stay is movable along the rail. For this reason, when the buckle is pulled by the actuation of the pulling device when the vehicle undergoes a sudden deceleration, the buckle stay is moved along the shape of the rail.

In this case, the buckle stay first moves from the position in the ordinary state to the downward direction of the vehicle, and next is pulled in the vehicle occupant restraining direction of the webbing belt.

As a result, the buckle body supported by the buckle stay is moved from the position where it engages with the tongue plate to the vehicle occupant restraining position of the webbing belt in the downward direction of the vehicle, and is thereafter pulled to the lumbar region-corresponding position.

Thus, this configuration can more reliably restrain the lumbar region of the vehicle occupant with the webbing belt.

Also, the buckle pretensioner system can effectively utilize the force by which the buckle is pulled by the pulling device because the buckle pretensioner system uses the force generated by the pulling device as two forces: the force causing the buckle to move so that the buckle body moves from the engagement position to the vehicle occupant restraining position, and the force causing the buckle to move so that the buckle body is pulled from the vehicle occupant restraining position to the lumbar region-corresponding position.

In the buckle pretensioner system of either aspect of the invention, the buckle may include: a buckle body that engages with the tongue plate; and a buckle stay that supports the buckle body and is supported so that the buckle body is pivotable from the engagement position to the vehicle occupant restraining position of the webbing belt and movable to the lumbar region-corresponding position of the webbing belt. Also, the guide device may include: a guide-use piston that is moved by the actuation of the pulling device and pushes the buckle stay so that the buckle body in the engagement position pivots to the vehicle occupant restraining position; and a stopper that is disposed in correspondence to the vehicle occupant restraining position and the lumbar region-corresponding position, stops the pivoting of the buckle stay pushed by the guide-use piston, and guides, in the vehicle occupant restraining direction of the webbing belt, the buckle stay whose pivoting has been stopped, so that the buckle body moves to the lumbar region-corresponding position.

In the buckle pretensioner system with this configuration, the buckle stay is supported so that the buckle body is pivotable from the position where it engages with the tongue plate to the vehicle occupant restraining position of the webbing belt and movable to the lumbar region-corresponding position of the webbing belt.

In this buckle pretensioner system, the pulling device is actuated and the guide-use piston is moved when the vehicle undergoes a sudden deceleration.

Next, the buckle stay is pushed by the guide-use piston and pivots.

As a result, the buckle body supported by the buckle stay pivots from the position where it engages with the tongue plate to the vehicle occupant restraining position.

Next, when the buckle body pivots to the vehicle occupant restraining position, the pivoting buckle stay is stopped by the stopper.

Next, the buckle stay is guided by the stopper in the vehicle occupant restraining direction of the webbing belt. As a result, the buckle body is pulled from the vehicle occupant restraining position to the lumbar region-corresponding position.

Thus, the buckle pretensioner system with this configuration can more reliably restrain the lumbar region of the vehicle occupant with the webbing belt.

Also, the buckle pretensioner system can effectively utilize the force by which the buckle is pulled by the pulling device because the buckle pretensioner system uses the force generated by the pulling device as two forces: the force causing the buckle to move so that the buckle body moves from the engagement position to the vehicle occupant restraining position, and the force causing the buckle to move so that the buckle body is pulled from the vehicle occupant restraining position to the lumbar region-corresponding position.

In the buckle pretensioner system of either aspect of the invention, the buckle may include: a buckle body that engages with the tongue plate; and a buckle stay that supports the buckle body. Also, the guide device may include ribs that abut against a base end portion of the buckle stay opposite from the buckle body to pivotably support the buckle stay at an ordinary time so that the buckle body becomes pivotable from the engagement position to the vehicle occupant restraining position of the webbing belt due to the actuation of the pulling device, with the ribs being ruptured by the buckle stay due to the continuous actuation of the pulling device and guiding the buckle stay in the vehicle occupant restraining direction of the webbing belt so that the buckle body moves from the vehicle occupant restraining position to the lumbar region-corresponding position.

In the buckle pretensioner system with this configuration, the base end portion of the buckle stay is supported by the ribs so that the buckle body becomes pivotable from the position where it engages with the tongue plate to the vehicle occupant restraining position of the webbing belt.

In this buckle pretensioner system, the pulling device is actuated and the buckle is pulled when the vehicle undergoes a sudden deceleration.

As a result, the buckle stay pivots, and the buckle body supported by the buckle stay pivots from the engagement position to the vehicle occupant restraining position.

Next, when the buckle body pivots to the vehicle occupant restraining position, the buckle stay ruptures the ribs and is moved in the vehicle occupant restraining position of the webbing belt due to the continuous actuation of the pulling device. As a result, the buckle body is pulled from the vehicle occupant restraining position to the lumbar region-corresponding position.

Thus, the buckle pretensioner system with this configuration can more reliably restrain the lumbar region of the vehicle occupant with the webbing belt.

Also, the buckle pretensioner system can effectively utilize the force by which the buckle is pulled by the pulling device because the buckle pretensioner system uses the force generated by the pulling device as two forces: the force causing the buckle to move so that the buckle body moves from the engagement position to the vehicle occupant restraining position, and the force causing the buckle to move so that the buckle body is pulled from the vehicle occupant restraining position to the lumbar region-corresponding position.

In the buckle pretensioner system of either aspect of the invention, the buckle may include: a buckle body that engages with the tongue plate; and a buckle stay that supports the buckle body, includes a base end portion opposite from the buckle body, with the base end portion being pivotably axially supported so that the buckle body becomes pivotable from the engagement position to the vehicle occupant restraining position of the webbing belt, and is disposed with a long hole extending from the axially supported portion to the buckle body side of the buckle stay via axial support position retaining walls that maintain the axially supported position. Moreover, the pulling device may be coupled to an intermediate portion of the buckle stay, and the guide device may include: a support member that axially supports the base end portion of the buckle stay, ruptures the axial support position retaining walls of the buckle stay due to the continuous actuation of the pulling device, and supports the buckle stay so that the buckle stay is movable along the long hole; and a stopper that is disposed in correspondence to the vehicle occupant restraining position and the lumbar region-corresponding position, stops the pivoting of the buckle stay pivoted by the actuation of the pulling device, and guides the buckle stay in the vehicle occupant restraining direction of the webbing belt so that the buckle body moves to the lumbar region-corresponding position.

In this buckle pretensioner system, the base end portion of the buckle stay is pivotably axially supported by the support member so that the buckle body becomes pivotable from the position where it engages with the tongue plate to the vehicle occupant restraining position of the webbing belt.

In this buckle pretensioner system, the pulling device is actuated and the intermediate portion of the buckle stay is pulled by the pulling device when the vehicle undergoes a sudden deceleration.

As a result, the buckle stay pivots, and the buckle body supported by the buckle stay pivots from the engagement position to the vehicle occupant restraining position.

Next, when the buckle body pivots to the vehicle occupant restraining position, the pivoting of the buckle stay is stopped by the stopper.

Next, the axial support position retaining walls of the buckle stay are ruptured by the support member due to the continuous actuation of the pulling device, the support member the buckle body side of the long hole in the buckle stay, and the buckle stay is moved in the vehicle occupant restraining direction of the webbing belt. As a result, the buckle body is pulled from the vehicle occupant restraining position to the lumbar region-corresponding position.

Thus, the buckle pretensioner system with this configuration can more reliably restrain the lumbar region of the vehicle occupant with the webbing belt.

Also, the buckle pretensioner system can effectively utilize the force by which the buckle is pulled by the pulling device because the buckle pretensioner system uses the force generated by the pulling device as two forces: the force causing the buckle to move so that the buckle body moves from the engagement position to the vehicle occupant restraining position, and the force causing the buckle to move so that the buckle body is pulled from the vehicle occupant restraining position to the lumbar region-corresponding position.

In the buckle pretensioner system pertaining to the first aspect of the invention, the buckle stay may include: a buckle body that engages with the tongue plate, and a buckle stay that supports the buckle body and is configured as a link mechanism including a base end portion opposite from the buckle body, with the base end portion being pivotably axially supported. Moreover, the pulling device may be coupled to a joint portion of the link mechanism of the buckle stay, and the guide device may include an axial support member that pivotably axially supports the base end portion of the buckle stay.

In this buckle pretensioner system, the buckle stay is configured as a link mechanism, and the base end portion of the buckle stay is pivotably axially supported by the axial support member so that the buckle body becomes movable from the position where it engages with the tongue plate to the vehicle occupant restraining position of the webbing belt.

In this buckle pretensioner system, the pulling device is actuated and the joint portion of the buckle stay configured as a link mechanism is pulled by the pulling device when the vehicle undergoes a sudden deceleration.

As a result, the buckle stay configured as a link mechanism pivots while bending at the joint portion, and the buckle body supported by the buckle stay pivots and is pulled from the position where it engages with the tongue plate to the lumbar region-corresponding position.

Thus, the buckle pretensioner system with this configuration can more reliably restrain the lumbar region of the vehicle occupant with the webbing belt, which is preferable.

Also, the buckle pretensioner system can effectively utilize the force by which the buckle is pulled by the pulling device because the buckle pretensioner system uses the force generated by the pulling device as two forces: the force causing the buckle to move so that the buckle body moves from the engagement position to the vehicle occupant restraining position, and the force causing the buckle to move so that the buckle body is pulled from the vehicle occupant restraining position to the lumbar region-corresponding position.

In the buckle pretensioner system of either aspect of the invention, the buckle may include: a buckle body that engages with the tongue plate; a first buckle stay including a base end portion that is pivotably axially supported and engagement teeth disposed around an axis of the base end portion; and a second buckle stay that is coupled to the first buckle stay, is configured to be relatively movable in the vehicle occupant restraining direction of the webbing belt with respect to the first buckle stay, and supports the buckle body. Moreover, the pulling device may be coupled to the side of the second buckle stay opposite from the buckle body, and the guide device may include a rack that meshes with the engagement teeth of the first buckle stay, with the rack moving in a direction corresponding to the direction in which the buckle body pivots from the engagement position to the vehicle occupant restraining position of the webbing belt due to the actuation of the pulling device.

In the buckle pretensioner system with this configuration, the base end portion of the first buckle stay coupled to the second buckle stay opposite from the buckle body is pivotably axially supported so that the buckle body supported by the second buckle stay becomes pivotable from the position where it engages with the tongue plate to the vehicle occupant restraining position of the webbing belt.

In the buckle pretensioner system with this configuration, the pulling device is actuated and the rack is moved when the vehicle undergoes a sudden deceleration. The moving direction of the rack corresponds to the direction in which the buckle body pivots from the engagement position to the vehicle occupant restraining position.

For this reason, the engagement teeth of the base end portion of the first buckle stay meshed with the rack are moved by the rack, the first buckle stay pivots, and the buckle body supported by the second buckle stay pivots from the engagement position to the vehicle occupant restraining position.

Next, when the buckle body pivots to the vehicle occupant restraining position, the second buckle stay is moved by the pulling device in the vehicle occupant restraining direction with respect to the first buckle stay. As a result, the buckle body is pulled from the vehicle occupant restraining position to the lumbar region-corresponding position.

Thus, the buckle pretensioner system with this configuration can more reliably restrain the lumbar region of the vehicle occupant with the webbing belt.

Also, the buckle pretensioner system can effectively utilize the force by which the buckle is pulled by the pulling device because the buckle pretensioner system uses the force generated by the pulling device as two forces: the force causing the buckle to move so that the buckle body moves from the engagement position to the vehicle occupant restraining position, and the force causing the buckle to move so that the buckle body is pulled from the vehicle occupant restraining position to the lumbar region-corresponding position.

In the buckle pretensioner system of either aspect of the invention, the pulling device may include: a gas generator that ignites when the vehicle undergoes a sudden deceleration and causes a large amount of gas to be generated; a piston that is housed inside a cylinder and is moved by the gas generated by the gas generator; and a transmission member that includes one end coupled to the buckle and another end coupled to the piston, and which transmits a moving force of the piston to the buckle as a pulling force in the vehicle occupant restraining direction of the webbing belt.

In the buckle pretensioner system with this configuration, the gas generator is ignited and a large amount of gas is generated when the vehicle undergoes a sudden deceleration.

Next, the piston housed inside the cylinder is moved by the pressure of the gas.

Next, the moving force of the piston is transmitted to the buckle by the transmission member including one end coupled to the buckle and the other end coupled to the piston. The moving force is handled as the pulling force in the vehicle occupant restraining direction of the webbing belt, and the buckle is pulled in the vehicle occupant restraining direction of the webbing belt and to the vehicle occupant restraining position.

In this manner, the pulling device can be realized with a simple configuration.

As described above, the buckle pretensioner system pertaining to the present invention can preserve comfort when the vehicle occupant is seated and suppress the occurrence of the "submarine phenomenon" when the vehicle undergoes a sudden deceleration.

BRIEF DESCRIPTION OF THE DRAWINGS

FIG. 1A is a side view showing a buckle pretensioner system pertaining to a first embodiment of the invention at an ordinary time and in an initial stage of actuation;

FIG. 1B is a side view showing the buckle pretensioner system pertaining to the first embodiment of the invention in an intermediate stage of actuation;

FIG. 1C is a side view showing the buckle pretensioner system pertaining to the first embodiment of the invention in a final stage of actuation;

FIG. 2A is a side view showing a buckle pretensioner system pertaining to a second embodiment of the invention at an ordinary time and in an initial stage of actuation;

FIG. 2B is a side view showing the buckle pretensioner system pertaining to the second embodiment of the invention in an intermediate stage of actuation;

FIG. 2C is a side view showing the buckle pretensioner system pertaining to the second embodiment of the invention in a final stage of actuation;

FIG. 3A is a side view showing a buckle pretensioner system pertaining to a third embodiment of the invention at an ordinary time and in an initial stage of actuation;

FIG. 3B is a side view showing the buckle pretensioner system pertaining to the third embodiment of the invention in an intermediate stage of actuation;

FIG. 4B is a side view showing the buckle pretensioner system pertaining to the fourth embodiment of the invention in an intermediate stage of actuation;

FIG. 4C is a side view showing the buckle pretensioner system pertaining to the fourth embodiment of the invention in a final stage of actuation;

FIG. 5C is a side view showing the buckle pretensioner system pertaining to the fifth embodiment of the invention in a final stage of actuation;

FIG. 6C is a side view showing the buckle pretensioner system pertaining to the sixth embodiment of the invention in a final stage of actuation.

DETAILED DESCRIPTION OF THE INVENTION

First Embodiment

Figure 3C:
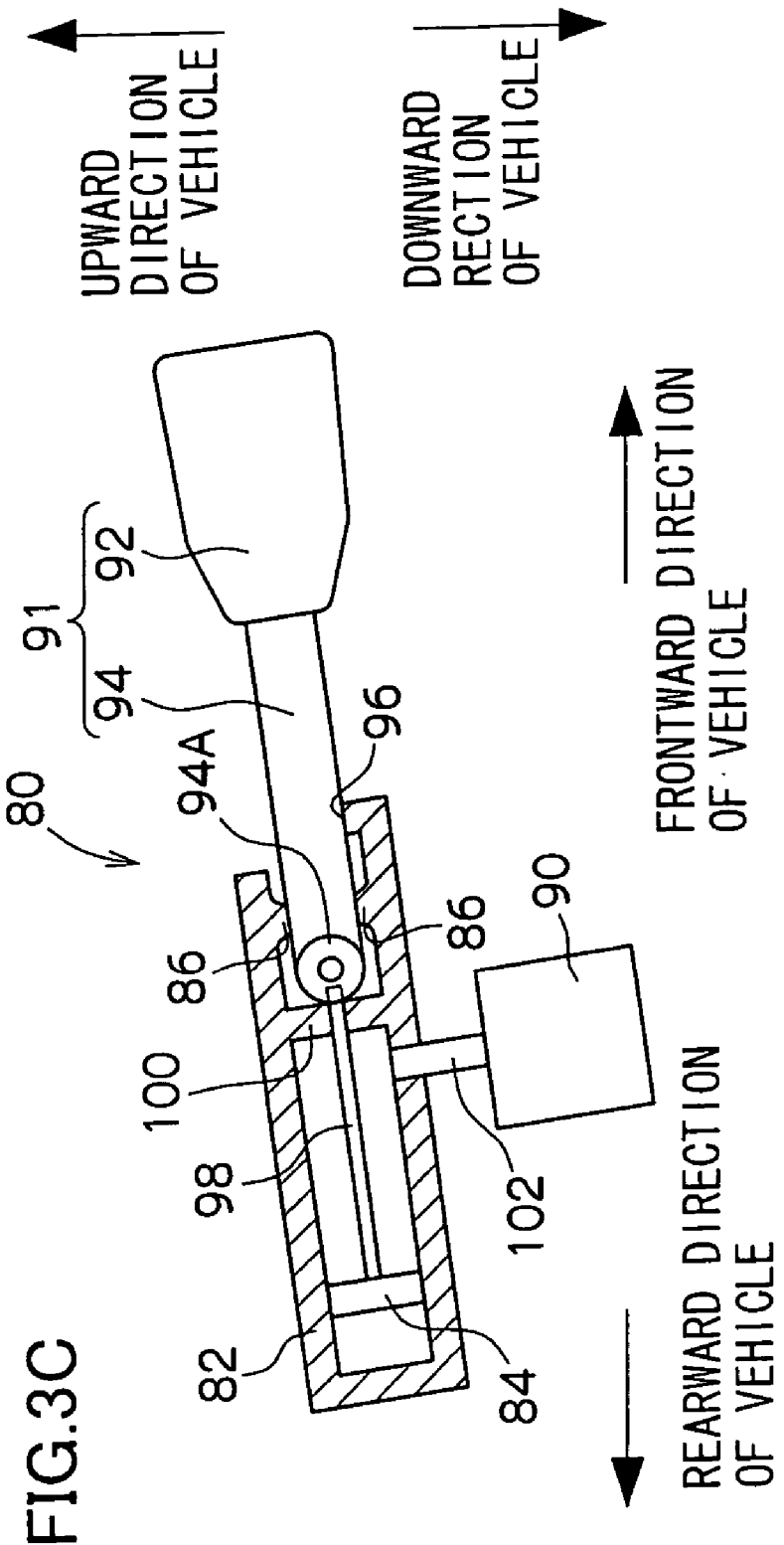
FIG. 3C is a side view showing the buckle pretensioner system pertaining to the third embodiment of the invention in a final stage of actuation.

A buckle pretensioner system 10 pertaining to a first embodiment of the invention is shown in side view in FIGS. 1A to 1C.

The buckle pretensioner system 10 is disposed with a base plate 32. The base plate 32 is fixed, by an attachment bolt and via a seat rail of a vehicle body, to the side surface (portions without reference numerals are not shown in the drawings) of a seat frame that is supported so that its position can be adjusted in the front-rear direction of the vehicle.

A roller 34 is disposed in the vehicle vertical direction center and the vehicle front-rear direction center of the base plate 32. The roller 34 is axially supported by the base plate 32 so as to be rotatable using the vehicle left-right direction as the axial direction.

A cylinder 36 is coupled to the front side of a lower end portion of the base plate 32. A piston 22 is housed in the cylinder 36 so as to be movable in the front-rear direction of the vehicle.

A gas generator 24 is disposed at the rear and upper side of the base plate 32. An unillustrated acceleration sensor (a sensor that detects deceleration) is attached to the gas generator 24, and when the acceleration sensor detects that the deceleration of the vehicle has reached a predetermined value, the gas generator 24 generates gas as a result of the actuation and ignition.

One end of a pipe 38 is coupled to the gas generator 24. The other end of the pipe 38 is coupled to the inside of the cylinder 36 at the rear side of the cylinder 36. Thus, the gas generator 24 and the cylinder 36 are communicated by the pipe 38. For this reason, the gas generated by the gas generator 24 passes through the pipe 38 and flows into the cylinder 36 (i.e., the rear side of the cylinder 36).

A rail 16 is coupled to the front and upper side of the base plate 32. The rail 16 is basically formed as a long plate-like body. One longitudinal-direction end portion of the rail 16 is fixed to the base plate 32, and the rail 16 is somewhat slanted and extends in the upward direction of the vehicle from the base plate 32 towards the vehicle front. At the end portion of the rail 16 at the side opposite from the end portion at the base plate 32, the rail 16 somewhat extends in the upward direction of the vehicle along a direction substantially orthogonal to the direction in which the rail 16 extends from the base plate 32 side. Thus, the rail 16 is formed in a substantial "L" shape.

A guide hole 20 is formed in the rail 16. The guide hole 16 is a long hole extending from the base plate 32 side of the rail 16 to the longitudinal-direction center portion of the rail 16.

A retaining pin 28 is disposed in the guide hole 20. The retaining pin 28 is linearly movable along the shape of the guide hole 20. A later-described buckle 11 is attached to the retaining pin 28, and the guide hole 20 retains the buckle 11.

A guide hole 18 is also formed in the rail 16. The guide hole 18 extends along the outer diameter of the rail 16 at the side opposite from the base plate 32 from the center portion of the rail 16, and is formed in a substantial "L" shape.

A retaining pin 26 is disposed in the guide hole 18. The retaining hole 26 is movable in the substantial "L" shape along the shape of the guide hole 18. The buckle 11 is attached to the retaining pin 26, and the guide hole 18 retains the buckle 11.

The buckle 11 is disposed with a buckle body 12 and a buckle stay 14.

The buckle stay 14 is formed as a long plate-like body. The retaining pin 28 is inserted through one longitudinal-direction end portion of the buckle stay 14, and the one longitudinal-direction end portion of the buckle stay 14 is retained so as to be linearly movable along the shape of the guide hole 20. The retaining pin 26 is inserted through the longitudinal-direction center portion of the buckle stay 14, and the longitudinal-direction center portion of the buckle stay 14 is retained so as to be movable in the substantial "L" shape along the shape of the guide hole 18.

The one longitudinal-direction end portion (base plate 32 side) of the buckle stay 14 somewhat extends in the downward direction of the vehicle along a direction substantially orthogonal to the longitudinal direction of the buckle stay 14. Thus, overall, the buckle stay 14 is formed in a substantial "L" shape.

One end of a wire 40 is attached by a coupling pin 30 to the extension portion of the buckle stay 14. The intermediate portion of the wire 40 is wound around the roller 34, and the other end of the wire 40 is coupled to the rear side of the piston 22.

Thus, when the piston 22 moves inside the cylinder 36 in the frontward direction of the vehicle, the buckle stay 14 is pulled from the substantially rearward direction of the vehicle.

The buckle body 12 is coupled to the other end of the buckle stay 14 (i.e., the end of the buckle stay 14 opposite from the end at the base plate 32 side). The buckle body 12 is supported by the buckle stay 14. The buckle body 12 is engageable with a tongue plate (not shown) inserted through an intermediate portion of a webbing belt (not shown) for restraining a vehicle occupant.

At an ordinary time, the buckle pretensioner system 10 described above is used in a state where the buckle body 12 is disposed at the uppermost position in its movable range (see FIG. 1A).

Next, the action of the buckle pretensioner system 10 pertaining to the first embodiment of the invention will be described.

In the buckle pretensioner system 10, when the tongue plate inserted through the intermediate portion of the webbing belt for restraining a vehicle occupant engages with the buckle body 12 of the buckle 11, the body of the vehicle occupant is restrained by the webbing belt.

When the vehicle undergoes a sudden deceleration in a state where the vehicle occupant is wearing the webbing belt in this manner, when the fact that the deceleration of the vehicle has reached a predetermined value is detected by the unillustrated acceleration sensor attached to the gas generator 24, the gas generator 24 is ignited due to the acceleration sensor and the gas generator 24 generates a large amount of gas.

Next, the gas passes from the gas generator 24 through the pipe 38 and is guided to the inside of the cylinder 36 (i.e., the rear side of the piston 22). As a result, inside the cylinder 36, the piston 22 is moved in the frontward direction of the vehicle by the inflowing gas.

As a result, the buckle stay 14 is pulled by the wire 40 coupled to the piston 22. As a result, the webbing belt is further pulled back and the body of the vehicle occupant is reliably restrained.

Here, the one longitudinal-direction end portion of the buckle stay 14 (i.e., the end portion of the buckle stay 14 at the base plate 32 side) is moved in the rearward direction of the vehicle along the extension direction of the guide hole 20 in the rail 16, and the center portion of the buckle stay 14 is moved in the downward direction of the vehicle along the extension direction of the guide hole 18 in the rail 16 and is further moved in the rearward direction of the vehicle.

As a result, in accompaniment with the movement of the buckle stay 14, the buckle body 12 moves from the position where it engages with the tongue plate at the ordinary time (see FIG. 1A) to a vehicle occupant restraining position in the downward direction of the vehicle (see FIG. 1B), and then is further pulled to a lumbar region-corresponding position positioned in the vehicle occupant restraining direction (see FIG. 1C).

In this manner, the buckle body 12 pivots from the position where it engages with the tongue plate at the ordinary time to the restraining position where the vehicle occupant is restrained by the webbing belt, and thereafter the buckle body 12 is pulled to the position corresponding to the lumbar region of the vehicle occupant. For this reason, the tongue plate engaged with the buckle body 12 is also guided to the lumbar region-corresponding position, and the webbing belt reliably restrains the lumbar region of the vehicle occupant. As a result, the webbing belt can improve the restraint of the lumbar region of the vehicle occupant. Thus, the buckle pretensioner system 10 can suppress the occurrence of the "submarine phenomenon."

Also, because the buckle pretensioner system 10 is configured so that the buckle body 12 is guided to the lumbar region-corresponding position when the vehicle undergoes a sudden deceleration, the buckle pretensioner system 10 can be applied to a common seat without having to implement countermeasures such as reducing the range of the reclinable angle of the seat or increasing the hardness of the front part of the seat cushion. Thus, the buckle pretensioner system 10 can preserve comfort when the vehicle occupant is seated in the seat.

Also, the buckle pretensioner system 10 can effectively utilize the force by which the buckle 11 is pulled by the gas generator 24, the piston 22 and the wire 40 because the buckle pretensioner system 10 uses the force generated by the gas generator 24, the piston 22 and the wire 40 as two forces: the force causing the buckle 11 to move so that the buckle body 12 moves from the engagement position to the vehicle occupant restraining position, and the force causing the buckle 11 to move so that the buckle body 12 is pulled from the vehicle occupant restraining position to the lumbar region-corresponding position.

Also, as mentioned previously, the buckle pretensioner system 10 can be realized with a simple configuration where the means for pulling the buckle stay 14 of the buckle 11 comprises the gas generator 24, the piston 22 and the wire 40.

Second Embodiment

A buckle pretensioner system 50 pertaining to a second embodiment of the invention is shown in side view in FIGS. 2A to 2C.

The buckle pretensioner system 50 is disposed with a cylinder 52. The cylinder 52 is fixed to a vehicle (not shown) inside the vehicle cabin using the front-rear direction of the vehicle as the axial direction.

A guide-use piston 54 is housed inside the cylinder 52 so as to be movable in the front-rear direction of the vehicle. The guide-use piston 54 includes a bar-like rod 55 that extends from the guide-use piston 54 in the frontward direction of the vehicle and whose tip end portion is rounded. When the guide-use piston 54 moves in the frontward direction of the vehicle, the rod 55 protrudes via a protrusion hole 52A formed in the front side of the cylinder 52. When the rod 55 protrudes to the outside of the piston 52 in correspondence to a later-described buckle 67, the rod 55 pushes against a buckle stay 70 of the buckle 67 so that a buckle body 68 of the buckle 67 pivots from a position where it engages with a tongue plate to a vehicle occupant restraining position.

A gas generator 56 is disposed, via a pipe 57, at the rear side of the cylinder 52. An unillustrated acceleration sensor (a sensor that detects deceleration) is attached to the gas generator 56, and when the acceleration sensor detects that the deceleration of the vehicle has reached a predetermined value, the gas generator 56 generates gas as a result of the gas generator 56 being actuated and igniting. The inside of the gas generator 56 and the inside of the cylinder 52 are communicated by the pipe 57, and the gas generated by the gas generator 56 passes through the pipe 57 and flows into the cylinder 52 (i.e., the rear side of the cylinder 52).

One end of a guide path 58 is coupled to the front and lower side of the cylinder 52. The position at which the guide path 58 is coupled to the cylinder 52 in the front-rear direction of the vehicle is a position at which the guide path 58 is communicated with the inside of the cylinder 52 further in the rearward direction of the vehicle than the guide-use piston 54 when the rod 55 of the guide-use piston 54 inside the cylinder 52 has maximally protruded to the outside of the cylinder 52.

A cylinder 60 is coupled to the other end of the guide path 58. The cylinder 60 is fixed to the vehicle inside the vehicle cabin and below the cylinder 52 using the front-rear direction of the vehicle as the axial direction. The other end of the guide path 58 is coupled to the front and upper side of the cylinder 60. Thus, the inside of the cylinder 60 and the inside of the cylinder 52 are communicated.

A piston 62 is housed inside the cylinder 60 so as to be movable in the front-rear direction of the vehicle.

A roller 64 is disposed further in the frontward direction of the vehicle than the cylinder 60. The roller 64 is rotatably axially supported inside the vehicle cabin using the vehicle left-right direction as the axial direction.

The buckle 67 is disposed further in the frontward direction of the vehicle than the cylinder 52. The buckle 67 includes the buckle body 68 and the buckle stay 70.

The buckle stay 70 is formed as a long plate-like body.

One end of a wire 63 is attached by a coupling pin 66 to one end portion of the buckle stay 70. The intermediate portion of the wire 63 is wound around the roller 34 from the lower direction of the vehicle, and the other end portion of the wire 63 is inserted through the front side of the cylinder 60 and coupled to the front side of the piston 62.

Thus, when the piston 62 moves inside the cylinder 36 in the rearward direction of the vehicle, the buckle stay 70 is pulled.

The buckle body 68 is coupled to the other end of the buckle stay 70. The buckle body 68 is supported by the buckle stay 70. The buckle body 68 is engageable with a tongue plate (not shown) inserted through an intermediate portion of a webbing belt (not shown) for restraining a vehicle occupant.

A stopper 72 is disposed at the front side and lower side of one end portion of the buckle stay 70. The stopper 72 is fixed to the vehicle inside the vehicle cabin. The stopper 72 is formed as a rectangular parallelepiped (in FIGS. 2A to 2C, the side thereof is shown). The stopper 72 is disposed in correspondence to the vehicle occupant restraining position and the lumbar region-corresponding position, and the upper surface of the stopper 72 is somewhat slanted in the upward direction of the vehicle from the vehicle rear towards the vehicle front. The stopper 72 stops the pivoting of the buckle stay 70 pushed by the guide-use piston 54, and guides the buckle stay 70 in the vehicle occupant restraining direction of the webbing belt so that the buckle body 68 moves to the lumbar region-corresponding position.

A twist coil spring 74 is disposed in the stopper 72. The center portion of the twist coil spring 74 is wound in a spiral, and both end portions 74A and 74B of the twist coil spring 74 linearly protrude from the center portion. The angle formed by both end portions 74A and 74B is an acute angle. The end portion 74A of the twist coil spring 74 is fixed to the stopper 72, and the end portion 74B is slanted in the upward direction of the vehicle from the vehicle rear towards the vehicle front. The end portion 74B of the twist coil spring 74 abuts against the lower side portion of the buckle stay 70 (i.e., the lower portion of the outer peripheral portion of the buckle stay 70 along the longitudinal direction), and at the ordinary time, the twist coil spring 74 urges the buckle stay 70 upward so that the buckle body 68 is positioned at the position where it engages with the tongue plate.

Thus, at the ordinary time, the buckle pretensioner system 50 described above is used in a state where the buckle body 68 is disposed at the uppermost position in its movable range (see FIG. 2A).

Next, the action of the buckle pretensioner system 50 pertaining to the second embodiment of the invention will be described.

In the buckle pretensioner system 50, when the tongue plate inserted through the intermediate portion of the webbing belt for restraining a vehicle occupant engages with the buckle body 68 of the buckle 67, the body of the vehicle occupant is restrained by the webbing belt.

When the vehicle undergoes a sudden deceleration in a state where the vehicle occupant is wearing the webbing belt in this manner, when the fact that the deceleration of the vehicle has reached a predetermined value is detected by the unillustrated acceleration sensor attached to the gas generator 56, the gas generator 56 is ignited due to the acceleration sensor and the gas generator 56 generates a large amount of gas.

Next, the gas passes from the gas generator 56 through the pipe 57 and is guided to the inside of the cylinder 52 (i.e., the rear side of the guide-use piston 54). As a result, inside the cylinder 52, the guide-use piston 54 is moved in the frontward direction of the vehicle by the inflowing gas.

As a result, the rod 55 of the guide-use piston 54 protrudes in the frontward direction of the vehicle from the protrusion hole 52A in the cylinder 52, and the upper side portion of the buckle stay 70 (i.e., the upper portion of the outer peripheral portion of the buckle stay 70 along the longitudinal direction) is pushed by the rod 55 of the guide-use piston 54, and the buckle stay 70 pivots, counter to the urging force resulting from the twist coil spring 74, from the position where it engages with the tongue plate to the vehicle occupant restraining position.

Next, when the base end portion of the guide-use piston 54 moves to the end of the inside of the cylinder 52 in the frontward direction of the vehicle, the pivoting of the buckle stay 70 is stopped by the stopper 72. In accompaniment therewith, the gas flowing into the cylinder 52 from the gas generator 56 flows into the cylinder 60 via the guide path 58.

As a result, the front side of the piston 62 inside the cylinder 60 is pushed by the gas, and the piston 62 moves in the rearward direction of the vehicle.

When the piston 62 moves in the rearward direction of the vehicle in this manner, the buckle stay 70 is pulled by the wire 63 coupled to the piston 62.

When the buckle stay 70 is pulled by the wire 63, the buckle stay 70 is pulled in the direction in which the webbing belt restrains the vehicle occupant while the buckle stay 70 is guided in a state where the upper side portion of the buckle stay 70 is pushed against the tip end portion of the guide-use piston 54 and where the lower side portion of the buckle stay 70 abuts against the upper surface of the stopper 72.

Because the buckle stay 70 moves in this manner, the buckle body 68 moves from the position where it engages with the tongue plate at the ordinary time (see FIG. 2A) to the vehicle occupant restraining position in the downward direction of the vehicle (see FIG. 2B), and is then pulled to the lumbar region-corresponding position positioned in the vehicle occupant restraining direction (see FIG. 2C).

In this manner, the buckle body 68 pivots from the position where it engages with the tongue plate at the ordinary time to the restraining position where the vehicle occupant is restrained by the webbing belt, and thereafter the buckle body 68 is pulled to the position corresponding to the lumbar region of the vehicle occupant. For this reason, the tongue plate engaged with the buckle body 68 is also guided to the lumbar region-corresponding position, and the webbing belt reliably restrains the lumbar region of the vehicle occupant. As a result, the webbing belt can improve the restraint of the lumbar region of the vehicle occupant. Thus, the buckle pretensioner system 50 can suppress the occurrence of the "submarine phenomenon."

Also, because the buckle pretensioner system 50 is configured so that the buckle body 68 is guided to the lumbar region-corresponding position when the vehicle undergoes a sudden deceleration, the buckle pretensioner system 50 can be applied to a common seat without having to implement countermeasures such as reducing the range of the reclinable angle of the seat or increasing the hardness of the front part of the seat cushion. Thus, the buckle pretensioner system 50 can preserve comfort when the vehicle occupant is seated in the seat.

Also, the buckle pretensioner system 50 can effectively utilize the force by the gas generator 56, the guide-use piston 54, the piston 62 and the wire 63 because the buckle pretensioner system 50 uses the force generated by the gas generator 56, the guide-use piston 54, the piston 62 and the wire 63 as two forces: the force causing the buckle 67 to move so that the buckle body 68 moves from the engagement position to the vehicle occupant restraining position, and the force causing the buckle 67 to move so that the buckle body 68 is pulled from the vehicle occupant restraining position to the lumbar region-corresponding position.

Also, as mentioned previously, the buckle pretensioner system 50 can be realized with a simple configuration where the means for pulling the buckle stay 70 of the buckle 67 comprises the gas generator 56, the piston 62 and the wire 63.

Third Embodiment

A buckle pretensioner system 80 pertaining to a third embodiment of the invention is shown in side view in FIGS. 3A to 3C.

The buckle pretensioner system 80 is disposed with a cylinder 82. The cylinder 82 is attached to a vehicle (not shown) inside the vehicle cabin in a state where the axial direction is somewhat slanted in the upward direction of the vehicle from the vehicle rear towards the vehicle front.

A piston 84 is housed inside the cylinder 82 so as to be movable in the front-rear direction of the vehicle along the axial direction of the cylinder 82.

The front side of the cylinder 82 along the axial direction is open. The lower end wall of the lower side of the open place (called "open portion" below) extends further in the frontward direction of the vehicle along the axial direction of the cylinder 82 than the upper end wall of the upper side of the open portion, is formed as a stopper 96 for stopping the pivoting of a later-described buckle 91, and corresponds to the vehicle occupant restraining position of a later-described buckle body 92.

A pair of ribs 86 that protrude in mutually opposite directions (directions orthogonal to the axial direction of the cylinder 82; both ends in the vertical direction of the vehicle) is integrally formed on the upper end wall and the lower end wall of the open portion. At the ordinary time, the ribs 86 abut against a rotating portion 94A of a buckle stay 94 and pivotably support the buckle stay 94 so that the buckle body 92 becomes pivotable from the position where it engages with the tongue plate to the vehicle occupant restraining position. In a state where the buckle stay 94 is abutted against the stopper 96, the ribs 86 are pulled in the rearward direction of the vehicle along the axial direction of the cylinder 82 by a later-described wire 98, whereby the ribs 86 rupture and guide the buckle stay 94 to the vehicle occupant restraining position of the webbing belt so that the buckle body 92 moves from the vehicle occupant restraining position to the lumbar region-corresponding position.

A stopper 100 is disposed inside the cylinder 82 further in the rearward direction of the vehicle than the pair of ribs 86 along the axial direction of the cylinder 82. The stopper 100 is integrally formed with the cylinder 82 and closes the cylinder 82. The stopper 100 stops the movement of the buckle stay 94 pulled inside the cylinder 82 when the vehicle undergoes a sudden deceleration.

The buckle 91 includes the buckle body 92 and the buckle stay 94.

The buckle stay 94 is basically formed as a long plate-like body. The cylindrical rotating portion 94A is integrally disposed at the longitudinal-direction base end portion of the buckle stay 94. The rotating portion 94A is rotatably supported by the pair of ribs 86 in the circumferential direction of the rotating portion 94A.

One end of the wire 98 is coupled to the outer periphery of the rotating portion 94A of the buckle stay 94. The one end of the wire 98 is somewhat wound rightward around the outer periphery of the rotating portion 94A, the intermediate portion of the wire 98 is inserted through the stopper 100, and the other end of the wire 98 is coupled to the front side of the piston 84 along the axial direction of the cylinder 82.

Thus, when the piston 84 moves in the rearward direction of the vehicle along the axial direction of the cylinder 82, the wire 98 is pulled, and the buckle stay 94 pivots so that the buckle body 92 pivots to the vehicle occupant restraining position.

The buckle body 92 is coupled to the tip end portion of the buckle stay 94. The buckle body 92 is supported by the buckle stay 94. The buckle body 92 is engageable with a tongue plate (not shown) inserted through an intermediate portion of a webbing belt (not shown) for restraining a vehicle occupant.

A gas generator 90 is coupled to the cylinder 82 via a pipe 102. One end of the pipe 102 is coupled to the lower end wall of the cylinder 82 further in the rearward direction of the vehicle than the stopper 100 in the axial direction of the cylinder 82. The other end of the pipe 102 is coupled to the gas generator 90. Thus, the inside of the gas generator 90 and the inside of the cylinder 82 are communicated by the pipe 102.

An unillustrated acceleration sensor (a sensor that detects deceleration) is attached to the gas generator 90, and when the acceleration sensor detects that the deceleration of the vehicle has reached a predetermined value, the gas generator 90 generates gas as a result of the gas generator 90 being actuated and igniting. The gas generated by the gas generator 90 passes through the pipe 102 and flows into the cylinder 82 (i.e., the front side of the cylinder 82 in the axial direction).

Next, the action of the buckle pretensioner system 80 pertaining to the third embodiment of the invention will be described.

In the buckle pretensioner system 80, when the tongue plate inserted through the intermediate portion of the webbing belt for restraining a vehicle occupant engages with the buckle body 92 of the buckle 91, the body of the vehicle occupant is restrained by the webbing belt.

When the vehicle undergoes a sudden deceleration in a state where the vehicle occupant is wearing the webbing belt in this manner, when the fact that the deceleration of the vehicle has reached a predetermined value is detected by the unillustrated acceleration sensor attached to the gas generator 90, the gas generator 90 is ignited due to the acceleration sensor and the gas generator 90 generates a large amount of gas.

Next, the gas passes from the gas generator 90 through the pipe 102 and is guided to the inside of the cylinder 82 (i.e., in the rearward direction of the vehicle along the axial direction of the cylinder 82). As a result, inside the cylinder 82, the piston 84 is moved in the rearward direction of the vehicle along the axial direction of the cylinder 82 by the inflowing gas.

As a result, the wire 98 coupled to the piston 84 is pulled, and the rotating portion 94A of the buckle stay 94 is rotated (in FIGS. 3A to 3C, rightward rotation) as it abuts against the ribs 86. Thus, the entire buckle stay 94 pivots using the rotating portion 94A as a rotational axis.

Next, when the lower side portion (lower portion of the outer peripheral portion along the longitudinal direction) of the buckle stay 94 abuts against the stopper 96, the pivoting of the buckle stay 94 is stopped by the stopper 96.

Next, the wire 98 is continuously pulled in accompaniment with the movement of the piston 84 inside the cylinder 82, and the rotating portion 94A of the buckle stay 94 ruptures the pair of ribs 86 of the cylinder 82. For this reason, the buckle stay 94 is pulled in the rearward direction of the vehicle along the axial direction of the cylinder 82, i.e., the buckle stay 94 is pulled inside the cylinder 82.

Next, when the rotating portion 94A of the buckle stay 94 abuts against the stopper 100 inside the cylinder 82, the pulling of the buckle stay 94 inside the cylinder 82 is stopped.

Because the buckle stay 94 moves in this manner, the buckle body 92 moves from the position where it engages with the tongue plate at the ordinary time (see FIG. 3A) to the vehicle occupant restraining position in the downward direction of the vehicle (see FIG. 3B), and then is pulled to the lumbar region-corresponding position in the rearward direction of the vehicle (see FIG. 3C).

In this manner, the buckle body 92 pivots from the position where it engages with the tongue plate at the ordinary time to the restraining position where the vehicle occupant is restrained by the webbing belt, and thereafter the buckle body 92 is pulled to the position corresponding to the lumbar region of the vehicle occupant. For this reason, the tongue plate engaged with the buckle body 92 is also guided to the lumbar region-corresponding position, and the webbing belt reliably restrains the lumbar region of the vehicle occupant. As a result, the webbing belt can improve the restraint of the lumbar region of the vehicle occupant. Thus, the buckle pretensioner system 80 can suppress the occurrence of the "submarine phenomenon."

Also, because the buckle pretensioner system 80 is configured so that the buckle body 92 is guided to the lumbar region-corresponding position when the vehicle undergoes a sudden deceleration, the buckle pretensioner system 80 can be applied to a common seat without having to implement countermeasures such as reducing the range of the reclinable angle of the seat or increasing the hardness of the front part of the seat cushion. Thus, the buckle pretensioner system 80 can preserve comfort when the vehicle occupant is seated in the seat.

Also, the buckle pretensioner system 80 can effectively utilize the force by which the buckle 91 is pulled by the gas generator 90, the piston 84 and the wire 98 because the buckle pretensioner system 80 uses the force generated by the gas generator 90, the piston 84 and the wire 98 as two forces: the force causing the buckle 91 to move so that the buckle body 92 moves from the engagement position to the vehicle occupant restraining position, and the force causing the buckle 91 to move so that the buckle body 92 is pulled from the vehicle occupant restraining position to the lumbar region-corresponding position.

Also, as mentioned previously, the buckle pretensioner system 80 can be realized with a simple configuration where the means for pulling the buckle stay 94 of the buckle 91 comprises the gas generator 90, the piston 84 and the wire 98.

Fourth Embodiment

Figure 4A:
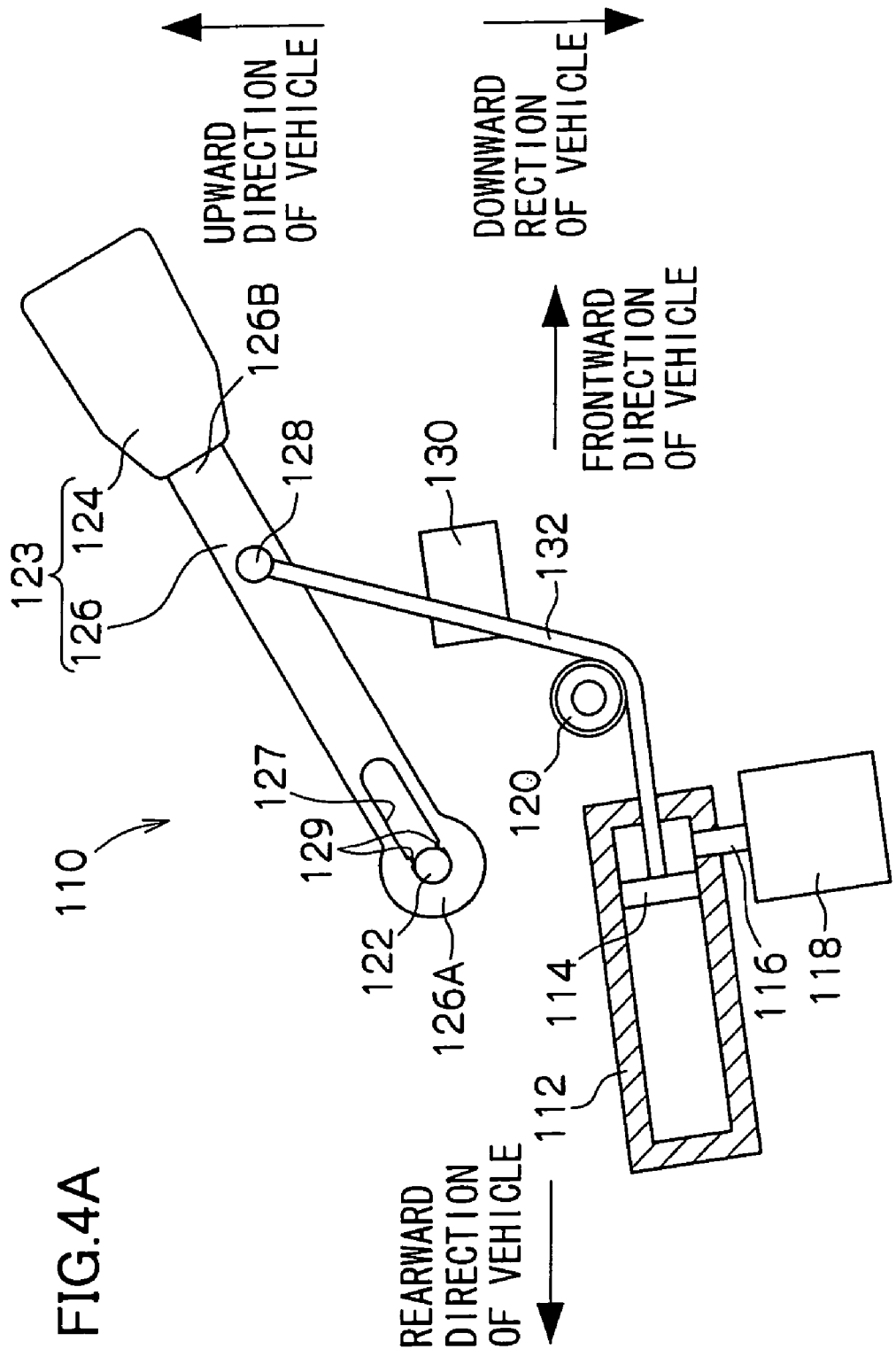
FIG. 4A is a side view showing a buckle pretensioner system pertaining to a fourth embodiment of the invention at an ordinary time and in an initial stage of actuation.

A buckle pretensioner system 110 pertaining to a fourth embodiment of the invention is shown in side view in FIGS. 4A to 4C.

The buckle pretensioner system 110 is disposed with a cylinder 112. The cylinder 82 is attached to a vehicle (not shown) inside the vehicle cabin in a state where the axial direction is somewhat slanted in the upward direction of the vehicle from the vehicle rear towards the vehicle front.

A piston 114 is housed inside the cylinder 112 so as to be movable in the front-rear direction of the vehicle along the axial direction of the cylinder 112.

A gas generator 118 is disposed, via a pipe 116, at the front and lower side of the cylinder 112 along the axial direction of the cylinder 112. An unillustrated acceleration sensor (a sensor that detects deceleration) is attached to the gas generator 118, and when the acceleration sensor detects that the deceleration of the vehicle has reached a predetermined value, the gas generator 118 generates gas as a result of the gas generator 118 being actuated and igniting. The inside of the gas generator 118 and the inside of the cylinder 112 are communicated by the pipe 116, and the gas generated by the gas generator 118 passes through the pipe 116 and flows into the cylinder 112 (i.e., the front side of the cylinder 112 along the axial direction).

A roller 120 is disposed further in the frontward and upward direction of the vehicle than the cylinder 112. The roller 112 is axially supported by the vehicle inside the vehicle cabin so as to be rotatable using the vehicle left-right direction as the axial direction.

A later-described buckle 123 is disposed further in the upward direction of the vehicle than the cylinder 112 and the roller 120. The buckle 123 includes a buckle body 124 and a buckle stay 126.

The buckle stay 126 is formed as a long plate-like body. One longitudinal-direction end portion 126A of the buckle stay 126 is penetrated by a support pin 122 and pivotably axially supported by the vehicle inside the vehicle cabin. Moreover, a guide hole 127 that is a long hole extending in the longitudinal direction of the buckle stay 126 is formed in the buckle stay 126 continuously with the hole through which the support pin 122 is inserted.

A pair of axial position retaining walls 129, which oppose each other in the width direction of the buckle stay 126 orthogonal to the longitudinal direction, is integrally formed with the boundary portion between the guide hole 127 and the hole through which the support pin 122 is inserted. In a state where the buckle stay 126 is abutted against a later-described stopper 130, the axial position retaining walls 129 are ruptured as a result of the buckle stay 126 being pulled by a later-described wire 132, so that the buckle body 124 can move from the vehicle occupant restraining position to the lumbar region-corresponding position.

The buckle body 124 is coupled to the other longitudinal-direction end portion 126B of the buckle stay 126. The buckle body 124 is supported by the buckle stay 126. The buckle body 124 is engageable with a tongue plate (not shown) that is inserted through an intermediate portion of a webbing belt (not shown) for restraining a vehicle occupant.

One end of the wire 132 is coupled by a coupling pin 128 to the longitudinal-direction center portion of the buckle stay 126. The intermediate portion of the wire 132 is wound around the roller 120 from the lower direction of the vehicle, and the wire 132 is inserted through the front side of the cylinder 112 along the axial direction. The other end portion of the wire 132 is coupled to the front side of the piston 114 along the axial direction of the cylinder 112.

Thus, when the piston 114 is moved in the rearward direction of the vehicle along the axial direction of the cylinder 112, the wire 132 is pulled and the buckle stay 126 pivots around the axis of the support pin 122.

The stopper 130 is disposed at the front and upper side of the roller 120. The stopper 130 is fixed to the vehicle inside the vehicle cabin. The stopper 130 is formed as a rectangular parallelepiped (in FIGS. 4A to 4C, the side thereof is shown). The stopper 130 is disposed in correspondence to the vehicle occupant restraining position and the lumbar region-corresponding position, and the upper surface of the stopper 130 is somewhat slanted in the upward direction of the vehicle from the vehicle rear towards the vehicle front. The stopper 130 stops the pivoting of the buckle stay 126 pulled by the wire 132, and guides the buckle stay 126 to the vehicle occupant restraining position of the webbing belt so that the buckle body 124 moves to the lumbar region-corresponding position.

Next, the action of the buckle pretensioner system 110 pertaining to the fourth embodiment of the invention will be described.

In the buckle pretensioner system 110, when the tongue plate inserted through the intermediate portion of the webbing belt for restraining a vehicle occupant engages with the buckle body 124 of the buckle 123, the body of the vehicle occupant is restrained by the webbing belt.

When the vehicle undergoes a sudden deceleration in a state where the vehicle occupant is wearing the webbing belt in this manner, when the fact that the deceleration of the vehicle has reached a predetermined value is detected by the unillustrated acceleration sensor attached to the gas generator 118, the gas generator 118 is ignited due to the acceleration sensor and the gas generator 118 generates a large amount of gas.

Next, the gas passes from the gas generator 118 through the pipe 116 and is guided to the inside of the cylinder 112 (i.e., the front side of the piston 114 along the axial direction of the cylinder 112). As a result, inside the cylinder 112, the piston 114 is moved in the rearward direction of the vehicle along the axial direction of the cylinder 112 by the inflowing gas.

As a result, the buckle stay 126 is pulled by the wire 132 coupled to the piston 114.

When the buckle stay 126 is pulled by the wire 132, the buckle stay 126 pivots using the position of the support pin 122 as the axial position.

Next, when the lower side portion of the buckle stay 126 (i.e., the lower portion of the outer peripheral portion of the buckle stay 126 along the longitudinal direction) abuts against the stopper 130, the pivoting of the buckle stay 126 is stopped by the stopper 130.

Next, the wire 132 is continuously pulled in accompaniment with the movement of the piston 114 inside the cylinder 112, whereby the support pin 122 that had pivotably supported the buckle stay 126 ruptures the axial position retaining walls 129 formed at the boundary portion between the guide hole 127 and the hole through which the support pin 122 is inserted. For this reason, the buckle stay 126 is pulled in the rearward direction of the vehicle along the longitudinal direction of the guide hole 127 in a state where the buckle stay 126 abuts against the upper surface of the stopper 130.

Next, when the support pin 122 abuts against the end portion of the guide hole 127 at the buckle body 124 side of the buckle stay 126, the pulling of the buckle stay 126 is stopped.

Because the buckle stay 126 moves in this manner, the buckle body 124 moves from the position where it engages with the tongue plate at the ordinary time (see FIG. 4A) to the vehicle occupant restraining position in the downward direction of the vehicle (see FIG. 4B), and then is pulled to the lumbar region-corresponding position positioned in the vehicle occupant restraining direction (see FIG. 4C).

In this manner, the buckle body 124 pivots from the position where it engages with the tongue plate at the ordinary time to the restraining position where the vehicle occupant is restrained by the webbing belt, and thereafter the buckle body 124 is pulled to the position corresponding to the lumbar region of the vehicle occupant. For this reason, the tongue plate engaged with the buckle body 124 is also guided to the lumbar region-corresponding position, and the webbing belt reliably restrains the lumbar region of the vehicle occupant. As a result, the webbing belt can improve the restraint of the lumbar region of the vehicle occupant. Thus, the buckle pretensioner system 110 can suppress the occurrence of the "submarine phenomenon."

Also, because the buckle pretensioner system 110 is configured so that the buckle body 124 is guided to the lumbar region-corresponding position when the vehicle undergoes a sudden deceleration, the buckle pretensioner system 110 can be applied to a common seat without having to implement countermeasures such as reducing the range of the reclinable angle of the seat or increasing the hardness of the front part of the seat cushion. Thus, the buckle pretensioner system 110 can preserve comfort when the vehicle occupant is seated in the seat.

Also, the buckle pretensioner system 110 can effectively utilize the force by which the buckle 123 is pulled by the gas generator 118, the piston 114 and the wire 132 because the buckle pretensioner system 110 uses the force generated by the gas generator 118, the piston 114 and the wire 132 as two forces: the force causing the buckle 123 to move so that the buckle body 124 moves from the engagement position to the vehicle occupant restraining position, and the force causing the buckle 123 to move so that the buckle body 124 is pulled from the vehicle occupant restraining position to the lumbar region-corresponding position.

Also, as mentioned previously, the buckle pretensioner system 110 can be realized with a simple configuration where the means for pulling the buckle stay 126 of the buckle 123 comprises the gas generator 118, the piston 114 and the wire 132.

Fifth Embodiment

Figure 5A:
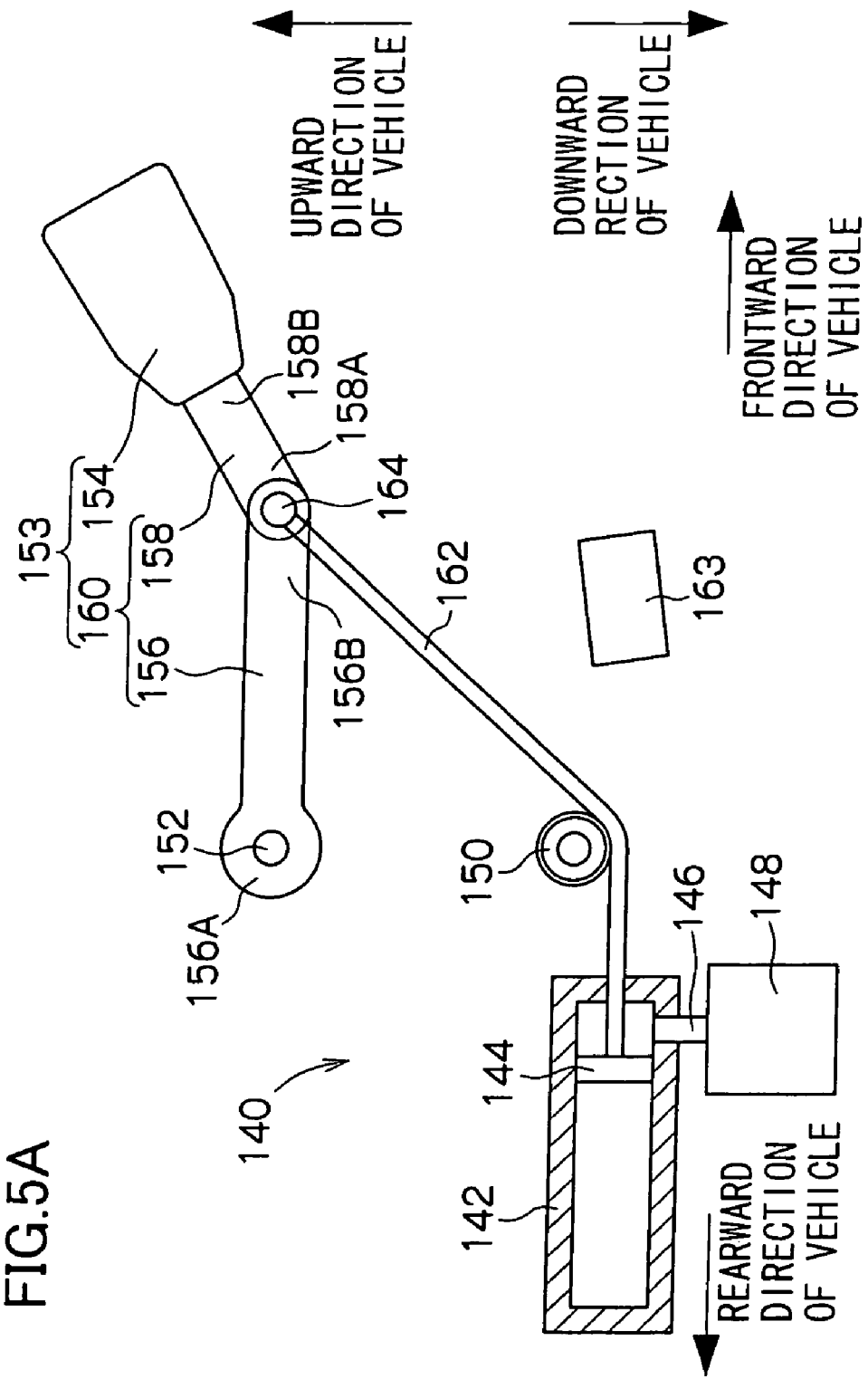
FIG. 5A is a side view showing a buckle pretensioner system pertaining to a fifth embodiment of the invention at an ordinary time and in an initial stage of actuation.
Figure 5B:
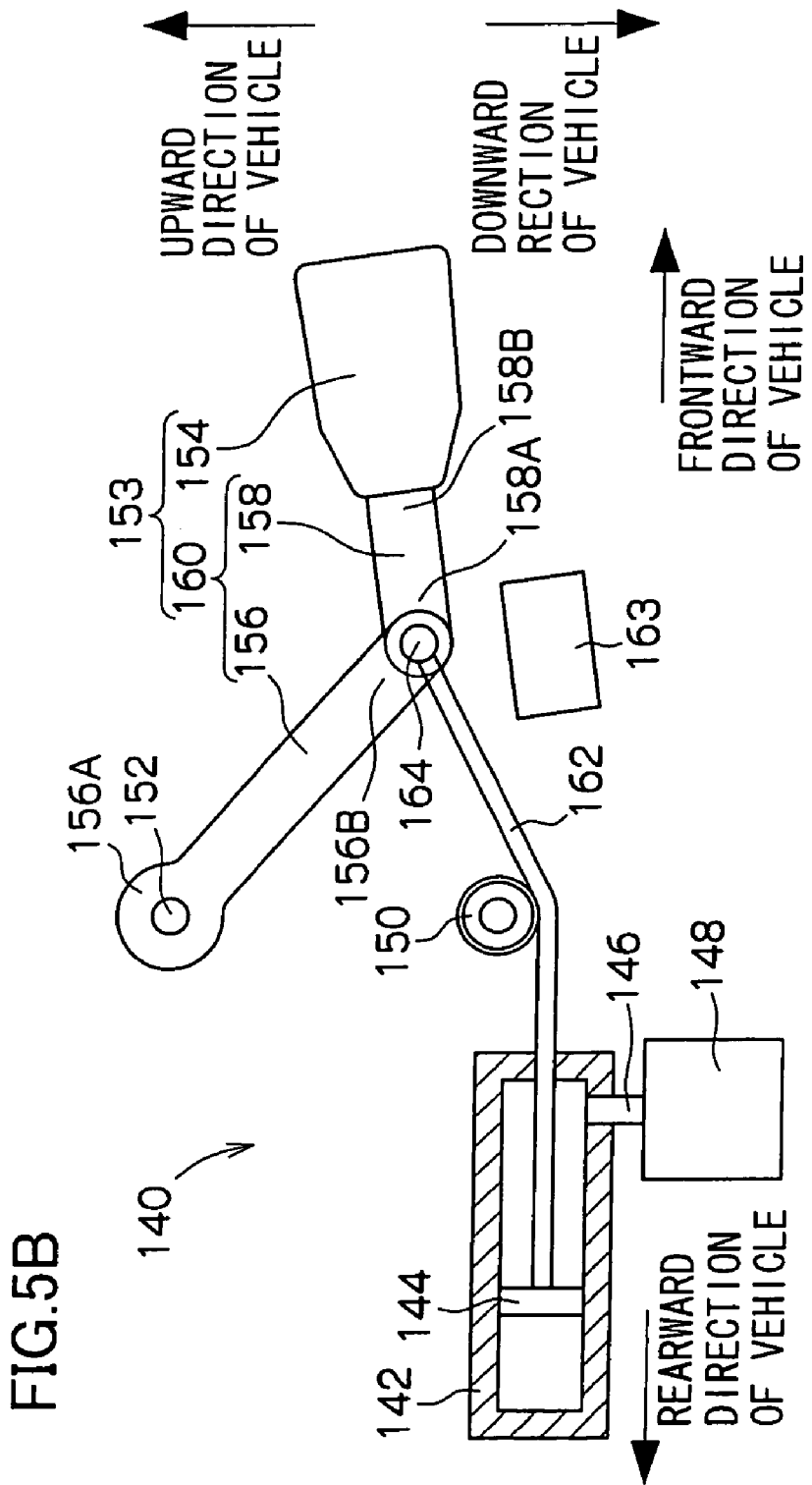
FIG. 5B is a side view showing the buckle pretensioner system pertaining to the fifth embodiment of the invention in an intermediate stage of actuation.

A buckle pretensioner system 140 pertaining to a fifth embodiment of the invention is shown in side view in FIGS. 5A to 5C.

The buckle pretensioner system 140 is disposed with a cylinder 142. The cylinder 142 is attached to a vehicle (not shown) inside the vehicle cabin using the front-rear direction of the vehicle as the axial direction.

A piston 144 is housed inside the cylinder 142 so as to be movable in the front-rear direction of the vehicle along the axial direction of the cylinder 142.

A gas generator 148 is disposed, via a pipe 146, at the front and lower side of the cylinder 142. An unillustrated acceleration sensor (a sensor that detects deceleration) is attached to the gas generator 148, and when the acceleration sensor detects that the deceleration of the vehicle has reached a predetermined value, the gas generator 148 generates gas as a result of the gas generator 148 being actuated and igniting. The inside of the gas generator 148 and the inside of the cylinder 142 are communicated by the pipe 146, and the gas generated by the gas generator 148 passes through the pipe 146 and flows into the cylinder 142 (i.e., the front side of the cylinder 142 along the axial direction).

A roller 150 is disposed further in the frontward direction of the vehicle than the cylinder 142. The roller 150 is axially supported by the vehicle inside the vehicle cabin so as to be rotatable using the vehicle left-right direction as the axial direction.

A later-described buckle 153 is disposed further in the upward direction of the vehicle than the roller 150. The buckle 153 includes a buckle body 154 and a buckle stay 160.

The buckle stay 160 is formed as a link mechanism including two links 156 and 158.

The link 156 is formed as a long plate-like body, and one longitudinal-direction end portion 156A of the link 156 is pivotably axially supported by a support pin 152. The other longitudinal-direction end portion 156B of the link 156 is coupled to the link 158.

The link 158 is similarly formed as a long plate-like body. One longitudinal-direction end portion 158A of the link 158 is coupled by a coupling pin 164 so as to be relatively rotatable with respect to the end portion 156B of the link 156.

The buckle body 154 is coupled to the other longitudinal-direction end portion 156B of the link 156. The buckle body 154 is supported by the link 158, and therefore by the buckle stay 160. The buckle body 154 is engageable with a tongue plate (not shown) that is inserted through an intermediate portion of a webbing belt (not shown) for restraining a vehicle occupant.

In the buckle stay 160, one end of a wire 162 is coupled to the coupling pin 162. The intermediate portion of the wire 162 is wound around the roller 150 from the lower direction of the vehicle, and the wire 162 is inserted through the front side of the cylinder 142. The other end portion of the wire 162 is coupled to the front side of the piston 144.

Thus, when the piston 144 is moved in the rearward direction of the vehicle, the wire 162 is pulled and the buckle stay 160 pivots.

A stopper 163 is disposed at the front side of the roller 150. The stopper 163 is formed as a rectangular parallelepiped (in FIGS. 5A to 5C, the side thereof is shown). The stopper 163 is disposed in correspondence to the lumbar region-corresponding position, and the upper surface of the stopper 163 is somewhat slanted in the upward direction of the vehicle from the vehicle rear towards the vehicle front. The stopper 163 stops the pivoting of the buckle stay 160 pulled by the wire 162 in a state where the buckle body 154 has moved to the lumbar region-corresponding position.

In the present embodiment, the buckle stay 160 is set so that when the coupled portion between the link 156 and the link 158 (i.e., the coupling pin 164) is pulled to the vicinity of the roller 150 as the buckle stay 160 is being pivoted by the pulling force of the wire 162, the orientation of the pulling force acting on the wire 162 becomes substantially equal to a tangential direction of a circumference drawn when the link 156 is rotated.

Next, the action of the buckle pretensioner system 140 pertaining to the fifth embodiment of the invention will be described.

In the buckle pretensioner system 140, when the tongue plate inserted through the intermediate portion of the webbing belt for restraining a vehicle occupant engages with the buckle body 154 of the buckle 153, the body of the vehicle occupant is restrained by the webbing belt.

When the vehicle undergoes a sudden deceleration in a state where the vehicle occupant is wearing the webbing belt in this manner, when the fact that the deceleration of the vehicle has reached a predetermined value is detected by the unillustrated acceleration sensor attached to the gas generator 148, the gas generator 148 is ignited due to the acceleration sensor and the gas generator 148 generates a large amount of gas.

Next, the gas passes from the gas generator 148 through the pipe 146 and is guided to the inside of the cylinder 142 (i.e., the front side of the cylinder 142). As a result, inside the cylinder 142, the piston 144 is moved in the rearward direction of the vehicle along the axial direction of the cylinder 142 by the inflowing gas.

As a result, the coupling pin 164 (the coupled portion between the link 156 and the link 158 of the buckle stay 160) of the buckle stay 160 is pulled by the wire 162 coupled to the piston 144.

When the buckle stay 160 is pulled by the wire 162, the buckle stay 160 pivots while bending around the position of the support pin 152.

Next, the wire 162 is continuously pulled in accompaniment with the movement of the piston 144 inside the cylinder 142, whereby the coupled portion between the link 156 and the link 158 bends and is pulled towards the roller 150 by the action of the link mechanism.

Next, when the lower side portion of the link 158 of the buckle stay 160 (i.e., the lower portion of the outer peripheral portion of the link 158 along the longitudinal direction) abuts against the stopper 163, the movement of the link 158, and therefore the buckle stay 160, is stopped by the stopper 163. As a result, the movement of the buckle body 154 is stopped at the lumbar region-corresponding position.

Because the buckle stay 160 moves in this manner, the buckle body 154 is pulled while pivoting from the position where it engages with the tongue plate at the ordinary time (see FIG. 5A) towards the lumbar region-corresponding position positioned in the vehicle occupant restraining direction (see FIG. 5B), and is finally pulled to the lumbar region-corresponding position (see FIG. 5C).

In this manner, the buckle body 154 pivots and is pulled from the position where it engages with the tongue plate at the ordinary time to the position corresponding to the lumbar region of the vehicle occupant. For this reason, the tongue plate engaged with the buckle body 154 is also guided to the lumbar region-corresponding position, and the webbing belt reliably restrains the lumbar region of the vehicle occupant. As a result, the webbing belt can improve the restraint of the lumbar region of the vehicle occupant. Thus, the buckle pretensioner system 140 can suppress the occurrence of the "submarine phenomenon."

Also, because the buckle pretensioner system 140 is configured so that the buckle body 154 is guided to the lumbar region-corresponding position when the vehicle undergoes a sudden deceleration, the buckle pretensioner system 140 can be applied to a common seat without having to implement countermeasures such as reducing the range of the reclinable angle of the seat or increasing the hardness of the front part of the seat cushion. Thus, the buckle pretensioner system 140 can preserve comfort when the vehicle occupant is seated in the seat.

Also, the buckle pretensioner system 140 can effectively utilize the force by which the buckle 153 is pulled by the gas generator 148, the piston 144 and the wire 162 because the buckle pretensioner system 140 uses the force generated by the gas generator 148, the piston 144 and the wire 162 as two forces: the force causing the buckle 153 to move so that the buckle body 154 moves from the engagement position to the vehicle occupant restraining position, and the force causing the buckle 153 to move so that the buckle body 154 is pulled from the vehicle occupant restraining position to the lumbar region-corresponding position.

Also, as mentioned previously, the buckle pretensioner system 140 can be realized with a simple configuration where the means for pulling the buckle stay 160 of the buckle 153 comprises the gas generator 148, the piston 144 and the wire 162.

Sixth Embodiment

Figure 6A:
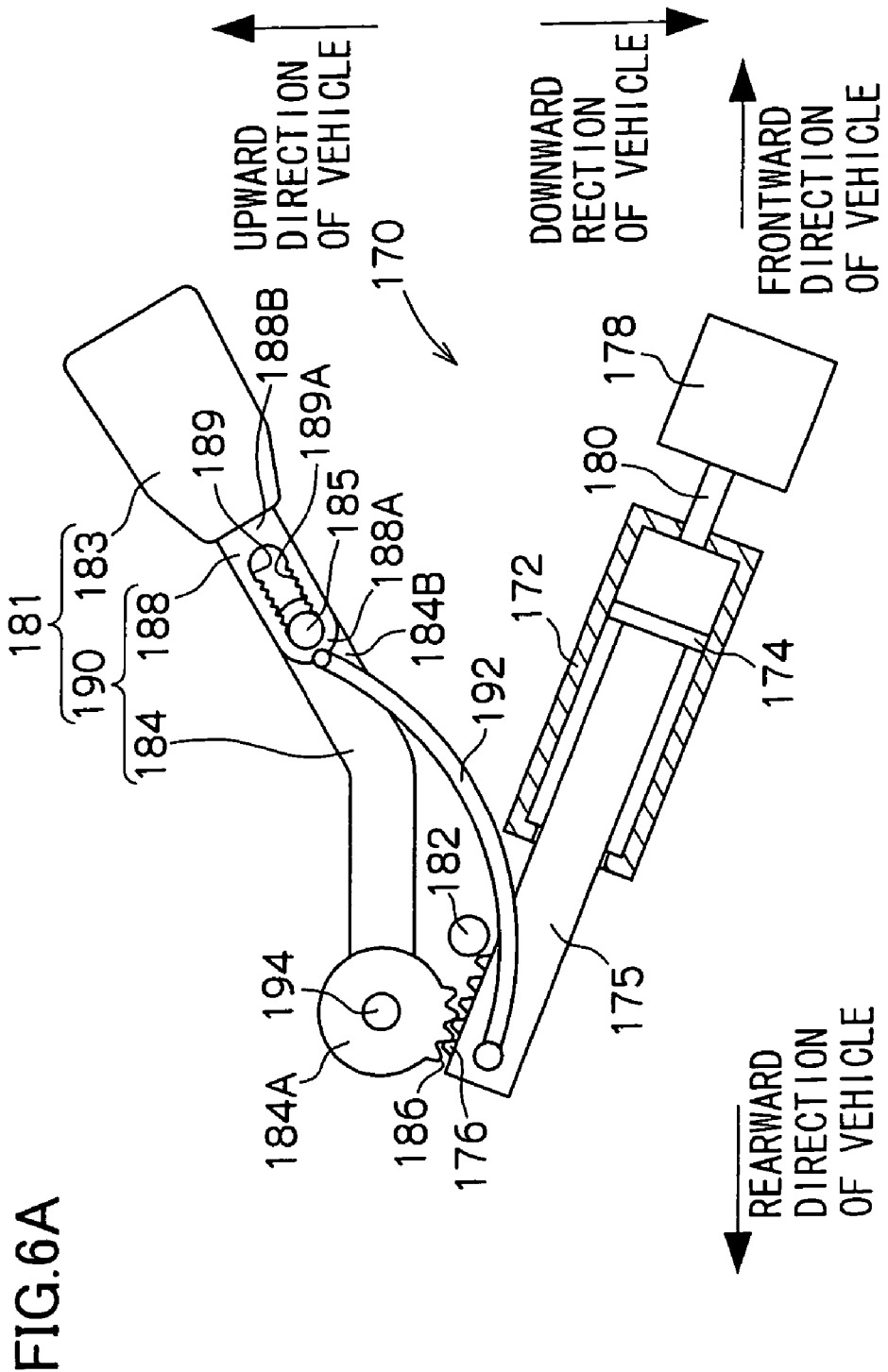
FIG. 6A is a side view showing a buckle pretensioner system pertaining to a sixth embodiment of the invention at an ordinary time and in an initial stage of actuation.
Figure 6B:
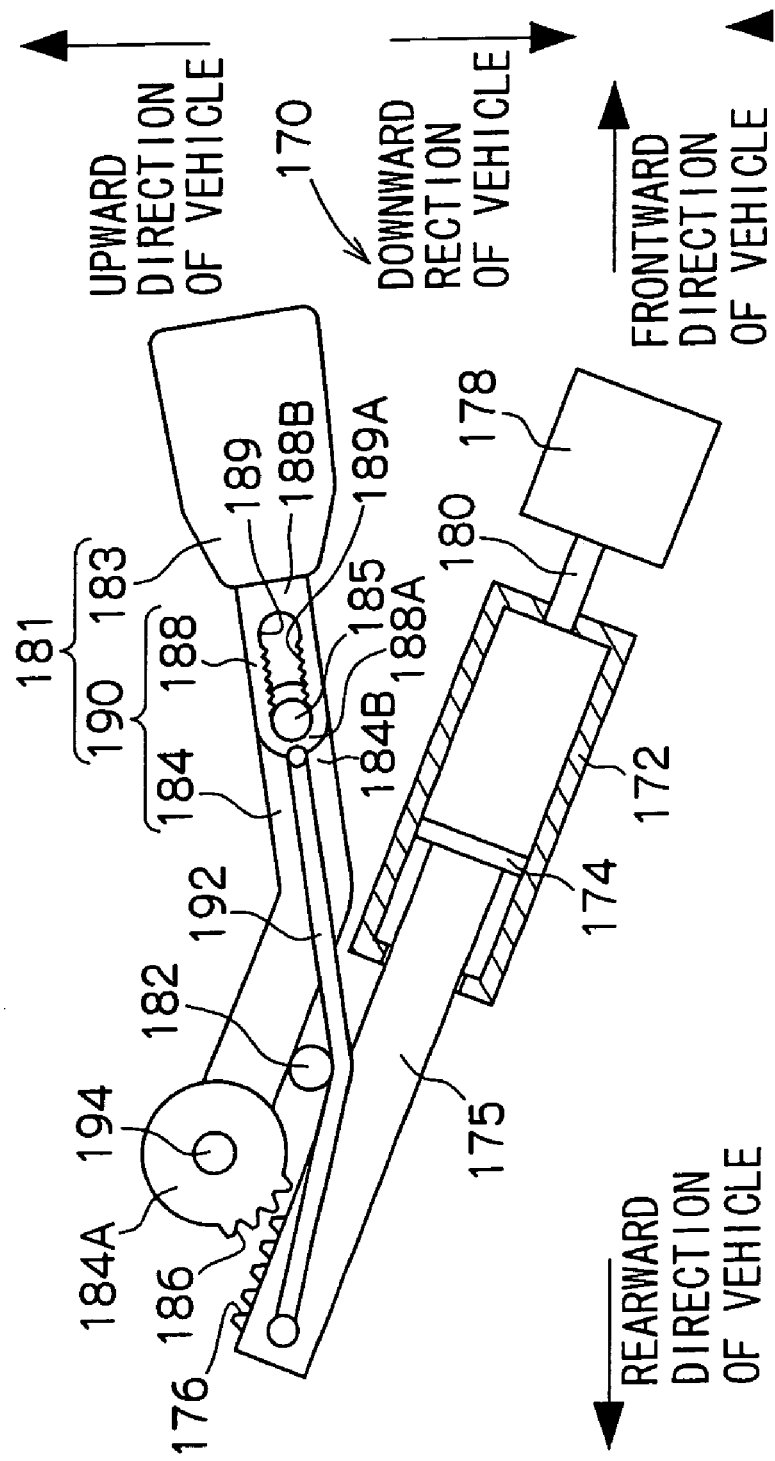
FIG. 6B is a side view showing the buckle pretensioner system pertaining to the sixth embodiment of the invention in an intermediate stage of actuation.

A buckle pretensioner system 170 pertaining to a sixth embodiment of the invention is shown in side view in FIGS. 6A to 6C.

The buckle pretensioner system 170 is disposed with a cylinder 172. The cylinder 172 is attached to a vehicle (not shown) inside the vehicle cabin in a state where the axial direction is somewhat slanted in the upward direction of the vehicle from the vehicle front towards the vehicle rear.

A piston 174 is housed inside the cylinder 172 so as to be movable in the front-rear direction of the vehicle along the axial direction of the cylinder 172.

A rack 175 is integrally formed with the rear side of the piston 174 along the axial direction. The rack 175 always protrudes to the outside of the cylinder 172 from the center portion along the axial direction thereof to the rear side end portion (i.e., the end portion of the cylinder 172 opposite from the piston 174). Plural rack teeth 176 are continuously and integrally disposed at the rear side of the upper side portion of the rack 175 (i.e., the upper portion of the outer peripheral portion of the rack 175 along the longitudinal direction).

A gas generator 178 is disposed, via a pipe 180, at the front side of the cylinder 172 along the axial direction. An unillustrated acceleration sensor (a sensor that detects deceleration) is attached to the gas generator 178, and when the acceleration sensor detects that the deceleration of the vehicle has reached a predetermined value, the gas generator 178 generates gas as a result of the gas generator 178 being actuated and igniting. The inside of the gas generator 178 and the inside of the cylinder 172 are communicated by the pipe 180, and the gas generated by the gas generator 178 passes through the pipe 180 and flows into the cylinder 172 (i.e., the front side of the cylinder 172 along the axial direction).

A roller 182 is disposed further in the rearward and upward direction of the vehicle than the cylinder 172. The roller 182 is axially supported by the vehicle inside the vehicle cabin so as to be rotatable using the vehicle left-right direction as the axial direction.

A later-described buckle 181 is disposed further in the upward direction of the vehicle than the roller 182. The buckle 181 includes a buckle body 183 and a buckle stay 190.

The buckle stay 190 includes a base end buckle stay 184 and a tip end buckle stay 188.

The base end buckle stay 184 is formed in a substantial "V" shape when seen in side view. The base end buckle stay 184 includes a base end portion 184A that is formed in a substantially cylindrical shape, and the base end buckle stay 184 is axially supported by a retaining pin 194 to the vehicle inside the vehicle cabin so as to be rotatable using the vehicle left-right direction as the axial direction. Engagement teeth 186 corresponding to the rack teeth 176 of the piston 174 are continuously and integrally formed on part of the outer periphery of the substantially cylindrical base end portion 184A, and at the ordinary time, the engagement teeth 186 are meshed with the rack teeth 176.

A long plate-like body that is formed in a substantial "V" shape when seen in side view extends from the base end portion 184A of the base end buckle stay 184. A cylindrical engagement portion 185 that is integrally formed using the vehicle left-right direction as the axial direction is disposed at a tip end portion 184B of the base end buckle stay 184 opposite from the base end portion 184A.

The tip end buckle stay 188 is coupled to the engagement portion 185 of the base end buckle stay 184. The tip end buckle stay 188 is formed as a long plate-like body.

A guide hole 189 that extends in the longitudinal direction from a base end portion 188A of the tip end buckle stay 188 is formed in the tip end buckle stay 188. Move-stopping pieces 189A that are formed like the teeth of a saw are continuously formed, excluding both extension-direction end portions of the guide hole 189, on portions of the inner peripheral edges of the guide hole 189 along the extension direction.

The engagement portion 185 of the base end buckle stay 184 is inserted in the guide hole 189, and the base end buckle stay 184 and the tip end buckle stay 188 are coupled together. At the ordinary time, the engagement portion 185 of the base end buckle stay 184 is inserted in the end portion of the guide hole 189 at the base end portion 188A side in the extension direction, so that the base end buckle stay 184 cannot move with respect to the tip end buckle stay 188. Also, when the tip end buckle stay 188 is pulled by a later-described wire 192, the move-stopping pieces 189A are ruptured by the engagement portion 185, whereby the tip end buckle stay 188 is movable with respect to the base end buckle stay 184 along the extension direction of the guide hole 189.

The buckle body 183 is coupled to a tip end portion 188B of the tip end buckle stay 188. The buckle body 183 is engageable with a tongue plate (not shown) that is inserted through an intermediate portion of a webbing belt (not shown) for restraining a vehicle occupant.

One end of the wire 192 is coupled to the base end portion 188A of the tip end buckle stay 188. The intermediate portion of the wire 192 passes below the roller 182 (with slack being given to the wire 192), and the other end of the wire 192 is coupled to the rear side portion of the rack 175 of the piston 174 along the axial direction of the cylinder 172.

Thus, when the piston 174 is moved in the rearward direction of the vehicle along the axial direction of the cylinder 172, the buckle stay 190 pivots and the wire 192 is pulled.

Next, the action of the buckle pretensioner system 170 pertaining to the sixth embodiment of the invention will be described.

In the buckle pretensioner system 170, when the tongue plate inserted through the intermediate portion of the webbing belt for restraining a vehicle occupant engages with the buckle body 183 of the buckle 181, the body of the vehicle occupant is restrained by the webbing belt.

When the vehicle undergoes a sudden deceleration in a state where the vehicle occupant is wearing the webbing belt in this manner, when the fact that the deceleration of the vehicle has reached a predetermined value is detected by the unillustrated acceleration sensor attached to the gas generator 178, the gas generator 178 is ignited due to the acceleration sensor and the gas generator 178 generates a large amount of gas.

Next, the gas passes from the gas generator 178 through the pipe 180 and is guided to the inside of the cylinder 172 (i.e., the front side of the piston 174 along the axial direction of the cylinder 172). As a result, inside the cylinder 172, the piston 174 and the rack 175 are moved in the rearward direction of the vehicle along the axial direction of the cylinder 172 by the inflowing gas.

As a result, the rack teeth 176 disposed on the rack 175 move in the rearward direction of the vehicle along the axial direction of the cylinder 172. For this reason, the engagement teeth 186 meshing with the rack teeth 176 of the rack 175 also move, and the base end portion 184A of the base end buckle stay 184 pivots around the axis of the retaining pin 194.

Thus, the buckle stay 190 pivots in the downward direction of the vehicle around the axis of the retaining pin 194.

When the buckle stay 190 pivots a predetermined amount, the intermediate portion of the wire 192 coupling the rear side portion of the rack 175 and the base end portion 188A of the tip end buckle stay 188 of the buckle stay 190 along the axial direction of the cylinder 172 abuts against the outer periphery of the roller 182 from the lower direction of the vehicle.

When the wire 192 abuts against the roller 182, the wire 192 becomes taut, and the moving force of the piston 174 and the rack 175 is transmitted as a pulling force to the tip end buckle stay 188 of the buckle stay 190.

When the moving force of the piston 174 and the rack 175 is transmitted as the pulling force to the tip end buckle stay 188, the move-stopping pieces 189A of the guide hole 189 are ruptured by the engagement portion 185 of the base end buckle stay 184, and the tip end buckle stay 188 moves until the end portion of the guide hole 189 at the tip end portion 188B side in the extension direction abuts against the engagement portion 185. As a result, the tip end buckle stay 188 moves with respect to the base end buckle stay 184 along the extension direction of the guide hole 189 and is pulled in the substantially rearward direction of the vehicle.

Next, when the engagement portion 185 of the base end buckle stay 184 abuts against the end portion of the guide hole 189 at the tip end portion 188B side in the extension direction, the pulling of the tip end buckle stay 188 is stopped.

Because the buckle stay 190 (i.e., the tip end buckle stay 188 coupled to the base end buckle stay 184) moves in this manner, the buckle body 183 moves from the position where it engages with the tongue plate at the ordinary time (see FIG. 6A) to the vehicle occupant restraining position in the downward direction of the vehicle (see FIG. 6B), and then is pulled to the lumbar region-corresponding position in the vehicle occupant restraining direction (see FIG. 6C).

In this manner, the buckle body 183 pivots from the position where it engages with the tongue plate at the ordinary time to the restraining position where the vehicle occupant is restrained by the webbing belt, and thereafter is pulled to the position corresponding to the lumbar region of the vehicle occupant. For this reason, the tongue plate engaged with the buckle body 183 is also guided to the lumbar region-corresponding position, and the webbing belt reliably restrains the lumbar region of the vehicle occupant. As a result, the webbing belt can improve the restraint of the lumbar region of the vehicle occupant. Thus, the buckle pretensioner system 170 can suppress the occurrence of the "submarine phenomenon."

Also, because the buckle pretensioner system 170 is configured so that the buckle body 183 is guided to the lumbar region-corresponding position when the vehicle undergoes a sudden deceleration, the buckle pretensioner system 170 can be applied to a common seat without having to implement countermeasures such as reducing the range of the reclinable angle of the seat or increasing the hardness of the front part of the seat cushion. Thus, the buckle pretensioner system 170 can preserve comfort when the vehicle occupant is seated in the seat.

Also, the buckle pretensioner system 170 can effectively utilize the force by which the buckle 181 is pulled by the gas generator 178, the piston 174 and the wire 192 because the buckle pretensioner system 170 uses the force generated by the gas generator 178, the piston 174 and the wire 192 as two forces: the force causing the buckle 181 to move so that the buckle body 183 moves from the engagement position to the vehicle occupant restraining position, and the force causing the buckle 181 to move so that the buckle body 183 is pulled from the vehicle occupant restraining position to the lumbar region-corresponding position.

Also, as mentioned previously, the buckle pretensioner system 170 can be realized with a simple configuration where the means for pulling the buckle stay 190 of the buckle 181 comprises the gas generator 178, the piston 174 and the wire 192.

What is claimed is:

1. A buckle pretensioner system disposed in a vehicle, the buckle pretensioner system comprising:
    a buckle that includes a buckle body that engages with a tongue plate inserted through an intermediate portion of a webbing belt for restraining a vehicle occupant, and an elongated buckle stay having a proximal end connected to the buckle body;
    a pulling device that is coupled to the buckle and actuated when the vehicle undergoes a sudden deceleration, with the pulling device pulling the buckle in a vehicle occupant restraining direction of the webbing belt; and
    a guide device which is pivotally connected to a distal end of the buckle stay and, due to the actuation of the pulling device, pivotally rotates the buckle body from an engagement position where the buckle body engages with the tongue plate at an ordinary time, through an intermediate position further toward a downward direction of the vehicle than the engagement position, and axially withdraws the distal end of the buckle stay to further position the buckle body to a lumbar region-corresponding final position that is positioned further toward a rearward direction of the vehicle than the intermediate position in the downward direction of the vehicle and corresponds to a lumbar region of a seated vehicle occupant,
    wherein the guide device includes a rail that corresponds to a moving path of the buckle body from the engagement position to the final lumbar region-corresponding position and is curved and formed in a substantial "L" shape, with the curved portion corresponding to the intermediate position of the webbing belt and being disposed further in the downward direction of the vehicle than the engagement position, and a retaining member that retains the buckle stay in the rail so that the buckle stay is movable along the rail along a substantially elliptical curve.

2. The buckle pretensioner system of claim 1, wherein the pulling device includes a gas generator that ignites when the vehicle undergoes a sudden deceleration and causes a large amount of gas to be generated, a piston that is housed inside a cylinder and is moved by the gas generated by the gas generator, and a transmission member that includes one end coupled to the buckle stay and another end coupled to the piston, and which transmits a moving force of the piston to the buckle as a pulling force in the vehicle occupant restraining direction of the webbing belt.

* * * * *